United States Patent
Jackson et al.

(10) Patent No.: US 11,293,458 B2
(45) Date of Patent: Apr. 5, 2022

(54) AIR FILTRATION CEILING FAN

(71) Applicant: Home Depot Product Authority, LLC, Atlanta, GA (US)

(72) Inventors: Trevor L. Jackson, Kirtland, OH (US); David M. Pehar, Willoughby, OH (US); William E. Rabbitt, Chesterland, OH (US); Marc Louis Vitantonio, South Russell, OH (US); Paul D. Stephens, Twinsburg, OH (US); Vikki Nowak, Cleveland Heights, OH (US); John Evan Spirk, Gates Mills, OH (US)

(73) Assignee: Home Depot Product Authority, LLC, Atlanta, GA (US)

(*) Notice: Subject to any disclaimer, the term of this patent is extended or adjusted under 35 U.S.C. 154(b) by 229 days.

(21) Appl. No.: 16/392,043

(22) Filed: Apr. 23, 2019

(65) Prior Publication Data
US 2019/0323524 A1    Oct. 24, 2019

Related U.S. Application Data

(60) Provisional application No. 62/661,479, filed on Apr. 23, 2018.

(51) Int. Cl.
*B01D 46/00* (2006.01)
*F04D 25/08* (2006.01)
(Continued)

(52) U.S. Cl.
CPC ....... *F04D 29/703* (2013.01); *B01D 46/0005* (2013.01); *B01D 46/4227* (2013.01);
(Continued)

(58) Field of Classification Search
CPC .......... B01D 46/0005; B01D 46/44; B01D 46/4227; F04D 29/703; F04D 29/403; F04D 25/088; F21V 33/0096
(Continued)

(56) References Cited

U.S. PATENT DOCUMENTS

| 3,822,483 A | 7/1974 | Hubner |
| 4,422,824 A | 12/1983 | Eisenhardt, Jr. |

(Continued)

FOREIGN PATENT DOCUMENTS

| CA | 2689702 A | 6/2011 |
| CN | 2401255 Y | 10/2000 |

(Continued)

OTHER PUBLICATIONS

ISA/U.S. International Search Report and Written Opinion issued in PCT/US19/28735, dated Jul. 25, 2019, 11 pgs.

*Primary Examiner* — Minh Chau T Pham
(74) *Attorney, Agent, or Firm* — Greenberg Traurig, LLP

(57) ABSTRACT

An air filtration ceiling fan apparatus includes a ceiling fan unit and an air filtration unit. The ceiling fan unit includes a motor and a plurality of fan blades operably coupled to the motor. The air filtration unit includes a filter element and a filter fan configured to move air through the filter element. The ceiling fan unit is operably connected to the air filtration unit to form the air filtration ceiling fan, and the air filtration ceiling fan is configured to attach to a ceiling.

18 Claims, 21 Drawing Sheets

(51) Int. Cl.
*F04D 29/70* (2006.01)
*F21V 33/00* (2006.01)
*B01D 46/42* (2006.01)
*B01D 46/44* (2006.01)
*F04D 29/40* (2006.01)
*F21Y 115/10* (2016.01)

(52) U.S. Cl.
CPC ........... *B01D 46/44* (2013.01); *F04D 25/088* (2013.01); *F04D 29/403* (2013.01); *F21V 33/0096* (2013.01); *B01D 2279/50* (2013.01); *F21Y 2115/10* (2016.08)

(58) Field of Classification Search
USPC ..... 55/385.1, 385.2, 471, 357; 315/291–297, 315/360–362; 200/330, 331; 362/235, 362/249.02
See application file for complete search history.

(56) References Cited

U.S. PATENT DOCUMENTS

| | | | |
|---|---|---|---|
| 4,750,863 A * | 6/1988 | Scoggins | F04D 29/703 416/146 R |
| 4,753,573 A | 6/1988 | McKnight | |
| 4,831,505 A | 5/1989 | Van Norman | |
| 4,840,650 A | 6/1989 | Matherne | |
| 5,094,676 A * | 3/1992 | Karbacher | B01D 50/00 416/146 R |
| 5,370,721 A | 12/1994 | Carnahan | |
| 5,453,049 A | 9/1995 | Tillman, Jr. et al. | |
| 5,460,787 A * | 10/1995 | Colon | A61L 9/12 239/55 |
| 5,641,340 A | 6/1997 | Kagen | |
| 5,676,316 A | 10/1997 | Hanna | |
| 5,795,131 A | 8/1998 | Crowhurst et al. | |
| 5,887,785 A * | 3/1999 | Yilmaz | F24F 1/0071 237/1 R |
| 5,904,744 A | 5/1999 | Kagen | |
| 6,004,365 A | 12/1999 | Fiacco | |
| 6,244,820 B1 | 6/2001 | Yilmaz | |
| 6,248,147 B1 * | 6/2001 | Liao | B01D 46/0005 416/146 R |
| 6,471,738 B1 * | 10/2002 | Thompson | F24F 8/10 55/471 |
| 6,481,237 B2 | 11/2002 | Kim | |
| 6,514,304 B2 | 2/2003 | Fiacco | |
| 6,558,120 B2 | 5/2003 | Kim et al. | |
| 6,779,976 B1 | 8/2004 | Carfagna et al. | |
| 6,790,004 B2 | 9/2004 | Steinheiser | |
| 6,857,852 B1 | 2/2005 | Carfagna et al. | |
| 6,994,522 B1 * | 2/2006 | Chin-Chih | F04D 29/388 416/146 R |
| 7,052,524 B1 * | 5/2006 | Venezzio, Jr. | B01D 46/0005 416/146 R |
| 7,115,158 B1 | 10/2006 | Landrum | |
| 7,674,305 B2 | 3/2010 | Lillquist | |
| 7,879,299 B2 | 2/2011 | McEllen | |
| 9,399,998 B1 | 7/2016 | Hardie | |
| 2001/0049927 A1 * | 12/2001 | Toepel | F24F 1/0071 55/385.2 |
| 2005/0147494 A1 | 7/2005 | Hoshino | |
| 2006/0067831 A1 | 3/2006 | Graves et al. | |
| 2007/0079588 A1 | 4/2007 | Busick | |
| 2007/0243819 A1 | 10/2007 | Ladanyi | |
| 2011/0225939 A1 * | 9/2011 | Loggins | B01D 46/0005 55/357 |
| 2012/0067013 A1 * | 3/2012 | Antony | B01D 46/4227 55/357 |
| 2015/0013282 A1 * | 1/2015 | Sorger | B01D 46/10 55/357 |
| 2017/0234319 A1 | 8/2017 | Seccareccia | |

FOREIGN PATENT DOCUMENTS

| | | |
|---|---|---|
| CN | 2564784 Y | 8/2003 |
| CN | 102225214 B | 10/2011 |
| CN | 204202028 U | 3/2015 |
| CN | 104564743 A | 4/2015 |
| CN | 204253385 U | 4/2015 |
| CN | 204436836 U | 7/2015 |
| CN | 204460592 U | 7/2015 |
| CN | 205579745 U | 9/2016 |
| CN | 106089770 A | 11/2016 |
| CN | 106268064 A | 1/2017 |
| CN | 107061333 A | 8/2017 |
| CN | 206409973 U | 8/2017 |
| CN | 107269562 A | 10/2017 |
| CN | 207049041 U | 2/2018 |
| EP | 348011 A2 | 12/1989 |
| EP | 1870114 A1 | 12/2007 |
| FR | 2250077 A1 | 5/1975 |
| JP | 3279673 B2 | 4/2002 |
| JP | 2003239900 A | 8/2003 |
| JP | 2004085025 A | 3/2004 |
| JP | 2015019988 A | 2/2015 |
| WO | 9408142 A1 | 4/1994 |
| WO | 2016023117 A1 | 2/2016 |
| WO | 2016200047 A1 | 12/2016 |

\* cited by examiner

FIG. 12A
FIG. 12B

AIR FILTRATION CEILING FAN

CROSS-REFERENCE TO RELATED APPLICATION

This application claims the benefit of U.S. Provisional Patent Application No. 62/661,479, filed Apr. 23, 2018, the entire contents of which are hereby incorporated by reference in their entirety.

BACKGROUND

Ceiling fans are commonly used to circulate air through a room. Ceiling fans attach to a ceiling and typically have wiring that passes through a vertical downrod or shaft to power a motor of the ceiling fan. Blades of the ceiling fan are turned by the motor, which push air to move the air through the room.

SUMMARY

An illustrative air filtration ceiling fan apparatus includes a ceiling fan unit and an air filtration unit. The ceiling fan unit includes a motor and a plurality of fan blades operably coupled to the motor. The air filtration unit includes a filter element and a filter fan configured to move air through the filter element. The ceiling fan unit is operably connected to the air filtration unit to form the air filtration ceiling fan, and the air filtration ceiling fan is configured to attach to a ceiling.

An illustrative air filtration apparatus includes a housing, a filter element within the housing, an air intake, and an exhaust port. The air filtration apparatus further includes a filter fan configured to move air into the housing through the air intake, through the filter element, and out of the housing through the exhaust port. The air filtration apparatus is also configured to attach to a ceiling fan.

BRIEF DESCRIPTION OF THE DRAWINGS

FIG. 12A is a perspective view of an air filtration ceiling fan with fan blades of a first type.

FIG. 12B is a perspective view of an air filtration ceiling fan with fan blades of a second type.

DETAILED DESCRIPTION

Figure 1:
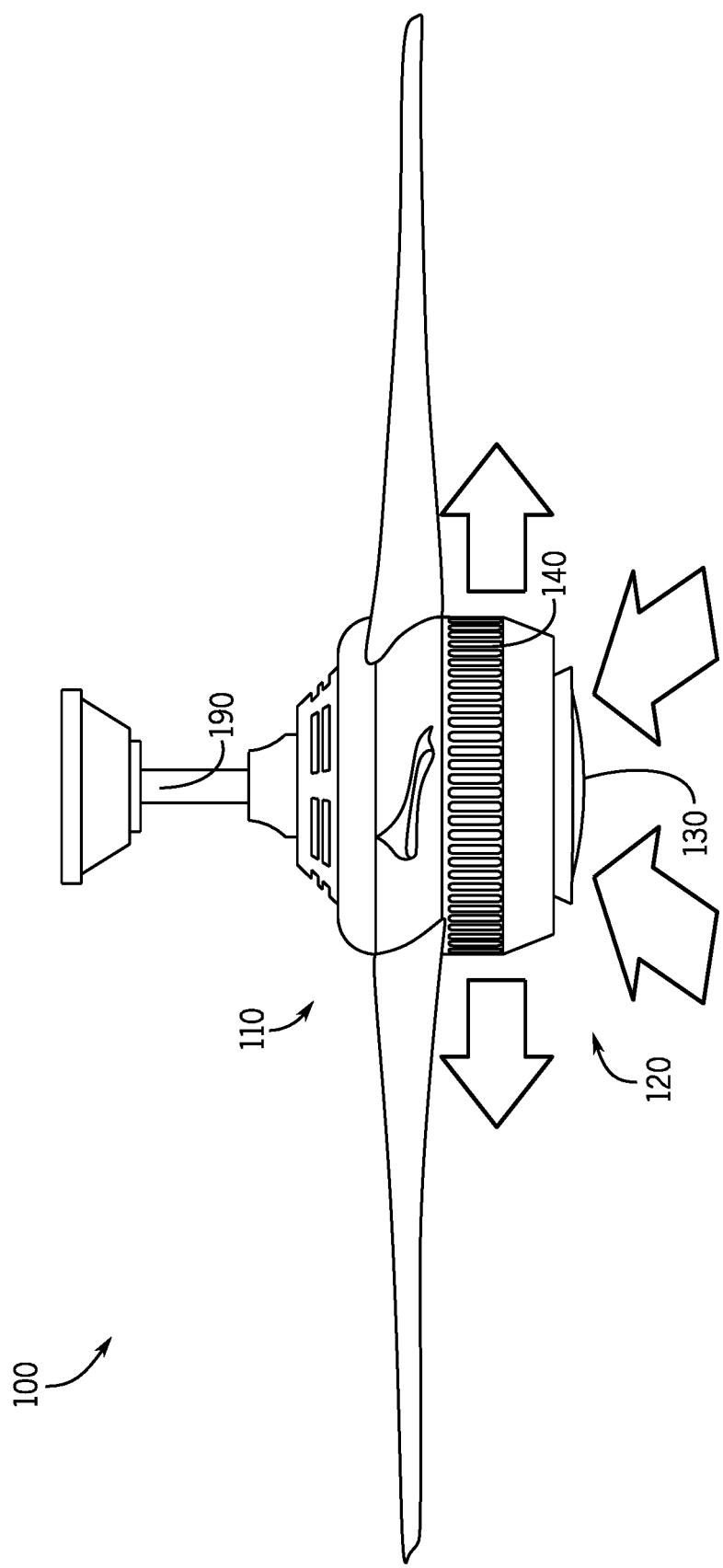
FIG. 1 is a side view of an example air filtration ceiling fan with an air intake on the bottom of an air filtration unit of the air filtration ceiling fan.

Described herein are various embodiments of assemblies comprising a filter fan assembly (or air filtration unit) and a ceiling fan assembly (ceiling fan unit), combined into a single air filtration ceiling fan. The combined air filtration unit (AFU) and ceiling fan unit (CFU) advantageously may have a symbiotic relationship. For example, the function of the AFU may benefit from having a larger CFU (that is, larger relative to the AFU) circulate air throughout the room, thereby exposing more air to the AFU to be filtered and moving filtered air throughout the room. The function of the CFU may benefit from the air in the room being filtered, thereby reducing the amount of dust in the room. This may reduce the amount of dust that may collect on the ceiling fan blades, and further may prevent dust from collecting on or entering the housing/motor components of the CFU.

Positioning the AFU on the ceiling—as opposed to other locations in the room—may also provide advantages. By attaching the AFU to a ceiling fan, the AFU may be positioned centrally in a room and above all furnishings and other items in the room. This positioning may enable efficient air circulation and filtering, as the AFU is distanced from furnishings or other items that may block air flow to or from the AFU. Furthermore, attaching an AFU to a ceiling fan also may position the AFU in a central location of the room without occupying floor space or otherwise displacing a furnishing or item that is desired to be at the center of the room. The placement of the AFU centrally also enables efficient airflow and filtering throughout the room.

Reference will now be made in detail to various embodiments, examples of which are illustrated in the accompanying drawings. In the drawings, like reference numerals refer to the same or similar features. First, with respect to FIGS. 1, 2A-2D, and 3, example air filtration ceiling fans with an air intake on the bottom of an AFU will be described. With respect to FIGS. 4A, 4B, 5A, and 5B, computer flow analyses of example air filtration ceiling fans with an air intake on the bottom of an AFU will be described. With respect to FIGS. 6A, 6B, and 6C, example air filtration ceiling fans with an air exhaust flow vectored upwards through a vertical flow channel in a CFU will be described. With respect to FIG. 7, an example air filtration ceiling fan with an AFU fan positioned within a CFU will be described. With respect to FIGS. 8A, 8B, and 9, air filtration ceiling fans with diverting structures will be described. With respect to FIG. 10, an example downrod for an air filtration ceiling fan will be described. With respect to FIGS. 11A, 11B, 12A, 12B, 13, 16A, 16B, 17, 18A, and 18B, an example air filtration ceiling fan with an air intake at the top of an AFU will be described. With respect to FIGS. 14A, 14B, 15A, and 15B, computer flow analyses of example air filtration ceiling fans with an air intake at the top of an AFU will be described. Finally, with respect to FIG. 19, examples of three different impeller style filter fans will be described.

Figure 2A:
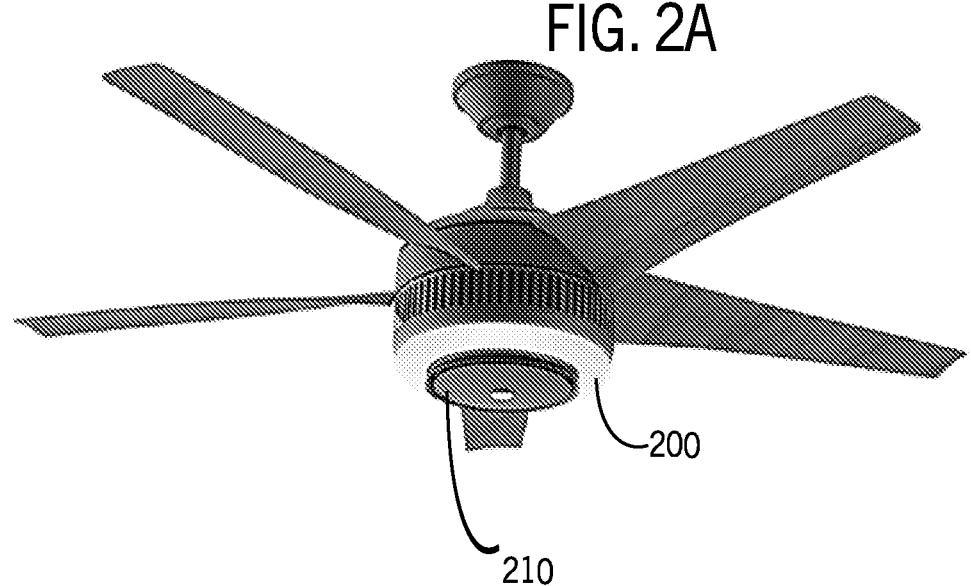
FIG. 2A is a perspective view of an example air filtration ceiling fan with a ring light.
Figure 2B:
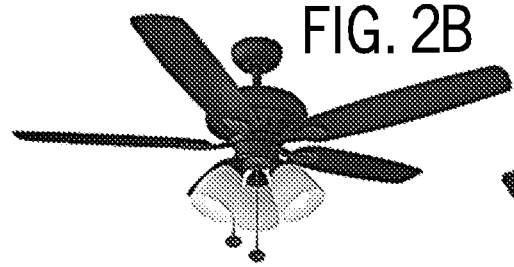
FIG. 2B is a perspective view of an example ceiling fan with a three-light configuration.
Figure 2C:
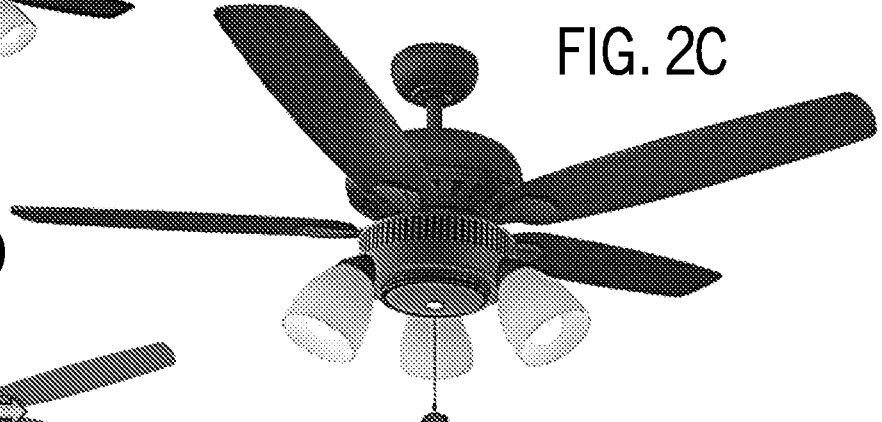
FIG. 2C is a perspective view of an example air filtration ceiling fan with a three-light configuration.
Figure 2D:
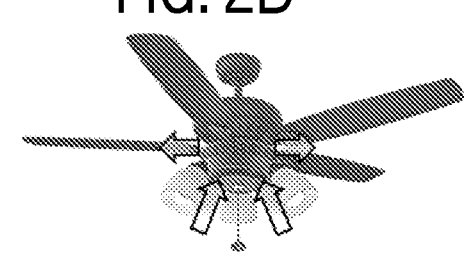
FIG. 2D is a perspective view of the example air filtration ceiling fan of FIG. 2C showing an example air flow through an air filtration unit.

FIG. 1 shows a ceiling fan 100 including an air filtration module, in accordance with various embodiments. FIGS. 2A, 2C, and 2D show other embodiments that are functionally similar to, but aesthetically different from the embodiment of FIG. 1. FIG. 2B shows an example ceiling fan without an air filtration unit.

The ceiling fan 100 includes a ceiling fan unit 110 (CFU) that may include conventional ceiling fan components, such as a fan motor and blade attachments. The ceiling fan 100 also includes an attachment mechanism 190 for attaching the ceiling fan 100 to the ceiling. The attachment mechanism 190 may attach, for example, to a junction box, such that wiring to power and/or control a motor of the ceiling fan and a filter man may be connected. Such wiring may pass through a downrod of the attachment mechanism 190 to the CFU 110. The ceiling fan 100 also includes an air filtration unit 120 (AFU) positioned below and mechanically and operably coupled to the CFU 110. In other words, the AFU 120 is attached to the CFU 110 on a side of the CFU 110 opposing the attachment mechanism 190. In other embodiments, the AFU 120 may be positioned above the CFU 110. In other embodiments, components of the CFU 110 and the AFU 120 may also exist in a common housing, such that the CFU 110 and the AFU 120 are not above or below one another.

As shown in FIG. 1, the AFU 120 intakes ambient air (as illustrated by the upward-oriented arrows) through an air intake 130 located on and/or proximate to a bottom surface of the AFU 120. The AFU 120 exhausts ambient air (as illustrated by the laterally-oriented arrows in FIG. 1) through an exhaust port 140 (which may comprise, for example, a series of small slots) located on a sidewall of the AFU 120. The AFU 120 of FIG. 1 is generally cylindrical in shape, and thus the exhaust port 140 may extend all the way around the circumference of the AFU 120 (e.g., around the entirety of a sidewall defining that circumference). Alternately, the exhaust 140 may be positioned on either a diagonal wall bridging the sidewall and upper surface of the AFU 120, or solely on an upper surface of the AFU 120 proximate to the CFU 110. In some embodiments, such arrangements may have some separation between the AFU 120 and CFU 110 to enable adequate passage of air from the AFU 120 exhaust port 140 to the surrounding ambient environment. It should be appreciated that a variety of fan types (including impeller and axial fan types) may support the directional flow patterns illustrated in FIG. 1.

Although the flow pattern of FIG. 1 shows air moving in a single direction, the air through the AFU 120 may alternately move in the opposite direction. In some embodiments, a filter fan of the AFU 120, or any of the other example AFUs described herein, may be operated to selectively rotate in multiple directions, such that air may be directed through the AFU in either direction, as desired. Control of the filter fan may be independent of control of the ceiling fan motor or may be tied to control of the ceiling fan motor. For example, if the AFU is only configured to move air in a single direction, it may operate independently if it can be turned on or off (or have a speed adjusted) without the operation of the ceiling fan motor changing. The control of the filter fan may be tied to the ceiling fan motor if it is only turned on or off (or its speed adjusted) when the ceiling fan motor operation is changed. In another example, control of the filter fan may be tied to the ceiling fan motor where the direction in which the filter fan moves air through the AFU changes when a direction that the ceiling fan motor rotates is changed. In some embodiments, an AFU may be more or less efficient operating to move air in a particular direction based on the direction the ceiling fan motor is rotating. Accordingly, the ceiling fan motor and the filter fan motor directions may be tied together so that the AFU operates in a more efficient manner.

FIG. 2A shows an example air filtration ceiling fan with a ring light 200. An air intake 210 of the example of FIG. 2A is within the bounds of the ring light 200. FIG. 2B shows an example ceiling fan without an AFU. Such an example with three lights can also be implemented with an AFU, as demonstrated in FIGS. 2C and 2D.

Figure 3:
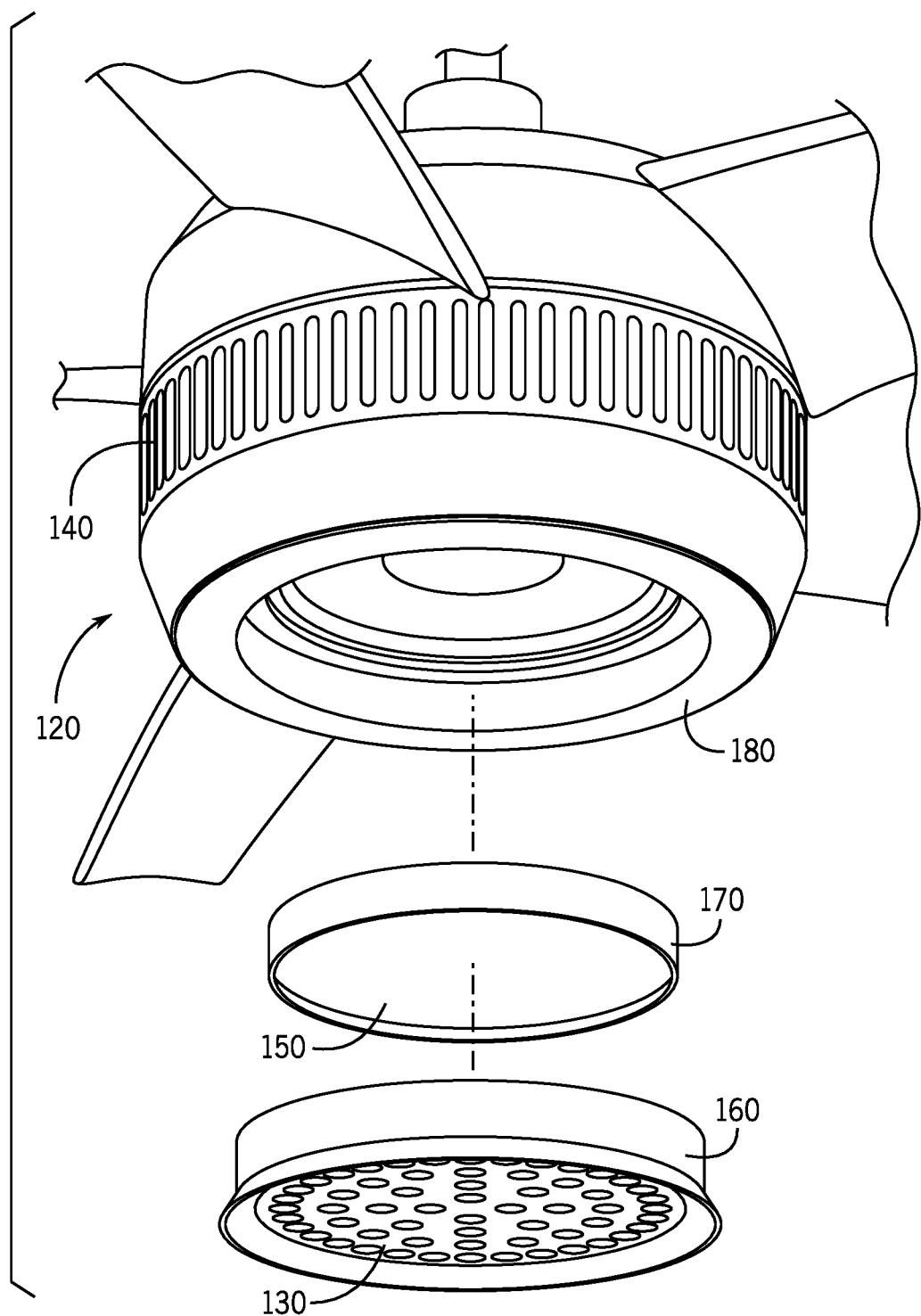
FIG. 3 is a partially-exploded perspective view of a portion of an example air filtration ceiling fan.

FIG. 3 is an exploded view of the AFU 120 of FIG. 1, in accordance with various embodiments of the present invention. As shown, the AFU 120 may include one or more filter elements 150 positioned to fully or partially intercept air passing from the air intake 130 to the exhaust 140 of the AFU 120. A filter element edge 170 may be configured to fit radially inside of an intake edge 160. In some embodiments, the filter element 150 may be positioned in the air flow path between the AFU intake 130 and a filter fan (not visible) to minimize contaminant accumulation on the blades of the AFU fan. Alternately, one or more filter elements 150 may be positioned at any point in the air flow channel between the intake 130 and the exhaust 140, including within the intake or exhaust ports and/or before/after the filter fan in the flow path. In embodiments in which multiple filter elements 150 are used, those elements 150 may be arranged serially with respect to the flow path so as to increase filtration efficiency. Further, in the case of multiple filter elements 150, coarser filter elements 150 may be arranged closer to the air intake 130 to prevent larger-sized contaminant particles from accumulating on the surfaces of the finer filter elements 150.

Filter media area is an important consideration for maximizing both the quality of exhausted AFU air and a service (cleaning, replacement) interval for the filter media. In some embodiments, filter area contained within a fixed size frame may be maximized by pressing the filter media into a pleated or corrugated form. Accordingly, the filter element 150, or any other filter elements described herein may have a pleated or corrugated surface.

The AFU 120 may also include certain features to facilitate removal of the filter element 150 from the AFU 120 for the purpose of cleaning and/or replacing. For example, the AFU 120 may include the intake edge 160 that extends up around the filter element edge 170. The air intake 130 and filter element 150 may be removed together, may be taken to a remote location, and may then be separated for cleaning and replacement of the filter assembly, thereby providing a way for the user to prevent dislodging of accumulated contaminants into areas of the home that need to be kept clean. Because the intake edge 160 may extend up around the filter element edge 170, some of the accumulated contaminants may be held in place on the filter element 150 by the air intake 130 until the components are taken apart for cleaning.

The AFU 120 may also include a lamp 180 for illuminating the space surrounding the AFU 120 and/or CFU 110. In the illustrated embodiment, a ring-shaped lamp 180 is shown that accommodates the positioning of other elements, specifically the filter element 150 and air intake 130. However, a variety of other lamp configurations are available to manage the inclusion and positioning of the intake 130, lamp 180 and other elements. The ability of the lamp 180 to deliver adequate illumination of the associated room is influenced by a number of factors, including: the lumen rating of the bulb and/or LED assembly; the refraction of light from the bulb and/or LED assembly through a lamp cover; and the area of the lamp cover. For instance, a small area lamp cover refracting a fixed lumen lamp output might appear excessively bright to the viewer. Increasing the area of the lamp cover (i.e., diffusing the light) may therefore be a means of softening the appearance of the lighting. In this respect, the choice of lamp cover shape (e.g., ring versus dome, single lamp versus multiple lamps) as well as lumen ratings, etc. may be considered as factors for different embodiments of air filtration ceiling fans that include one or more lights/lamps to reduce excessive strain on a user's vision.

Figure 4A:
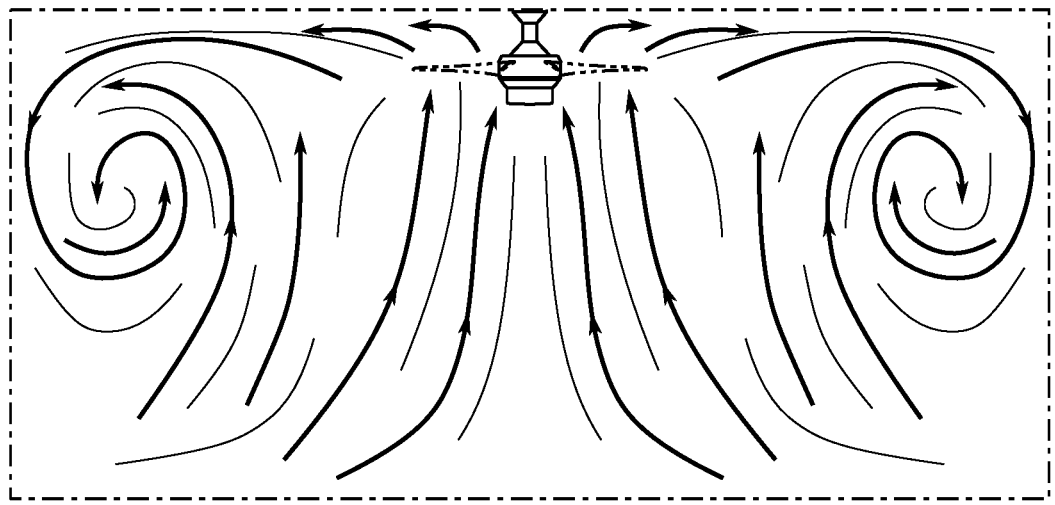
FIG. 4A illustrates a simulated airflow analysis of the air filtration ceiling fan of FIG. 1 based on the blades of the fan rotating in a first direction.
Figure 4B:
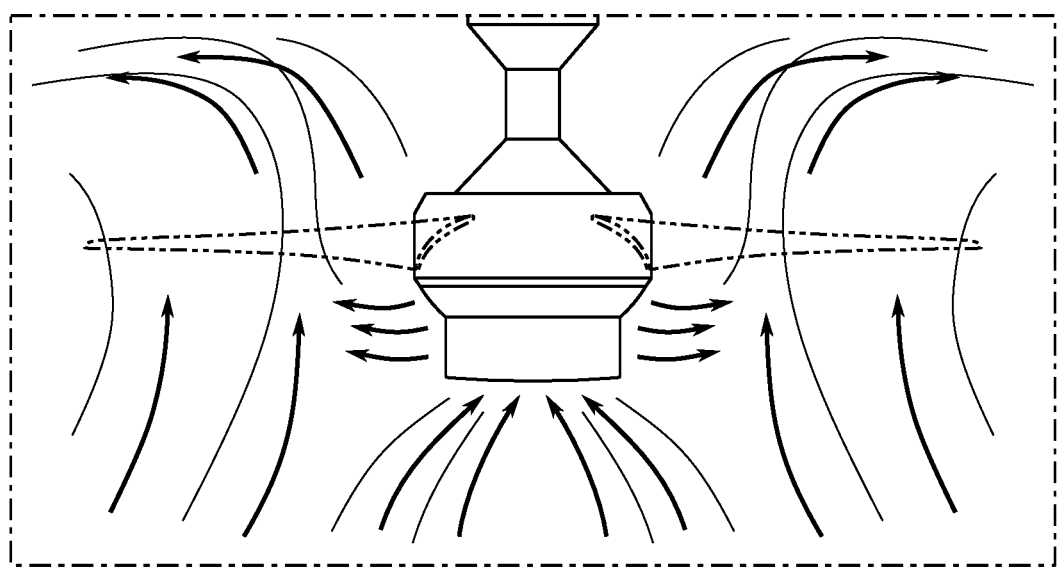
FIG. 4B is an enlarged view of a portion of the analysis of FIG. 4A.

FIGS. 4A and 4B show a computer-simulated airflow analysis for the fan 100 of FIG. 1. The effectiveness of the AFU 120 may be partly dependent upon how its air flow patterns interact with those of the CFU 100. The computer flow analysis of FIGS. 4A and 4B suggest that vectoring the exhaust flow of the AFU 120 to the CFU 110 flow stream increases the overall effectiveness of the product in the filtration of room air. In FIGS. 4A and 4B, the CFU 110 is circulating air up toward the ceiling. As shown in the detail of FIG. 4B, the air exhausted is pushed out into the flow being taken up toward the ceiling by the ceiling fan blades, thereby increasing the effectiveness of the AFU.

Figure 5A:
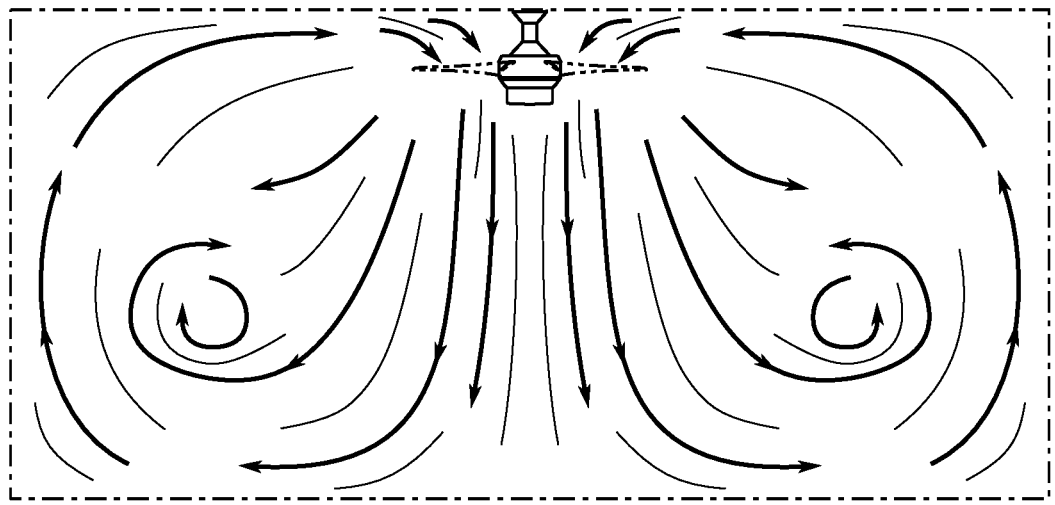
FIG. 5A a simulated airflow analysis of the air filtration ceiling fan of FIG. 1 based on the blades of the fan rotating in a second direction.
Figure 5B:
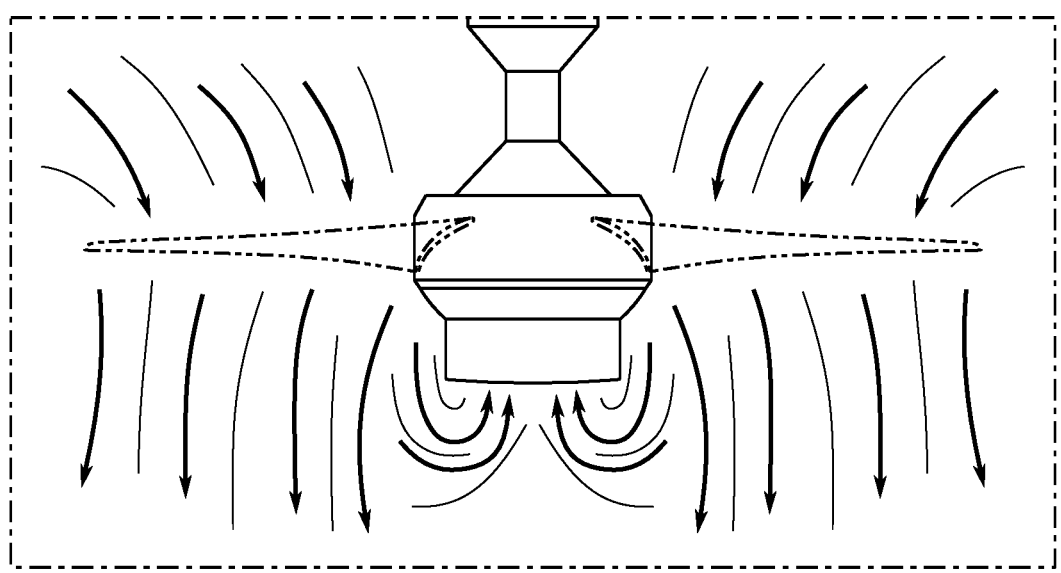
FIG. 5B is an enlarged view of a portion of the analysis of FIG. 5A.

FIGS. 5A and 5B show a computer flow analysis for an alternate flow pattern. As illustrated, the alternate air flow pattern suggesting less effective room air filtration. In particular, the exhaust air tends to recirculate back to the intake 130 of the AFU 120, as shown in the detail of FIG. 5B. A variety of design modifications may be implemented to minimize recirculation, including but not limited to a higher exhaust velocity to impart momentum to the exhaust stream and/or baffling to vector the exhaust air stream away from the intake. In the example of FIGS. 5A and 5B, the ceiling fan is pushing air down toward the floor, in contrast with FIGS. 4A and 4B. Accordingly, in some embodiments, AFUs configured in different ways may work more efficiently or less efficiently depending on the direction in which the fan blades are rotated. In some embodiments, the direction in which an AFU moves air (e.g., vertically upward or vertically downward from intake to exhaust) may be changed to adjust accordingly to a direction in which the ceiling fan blades rotate to maximize efficiency of the AFU.

Figure 6A:
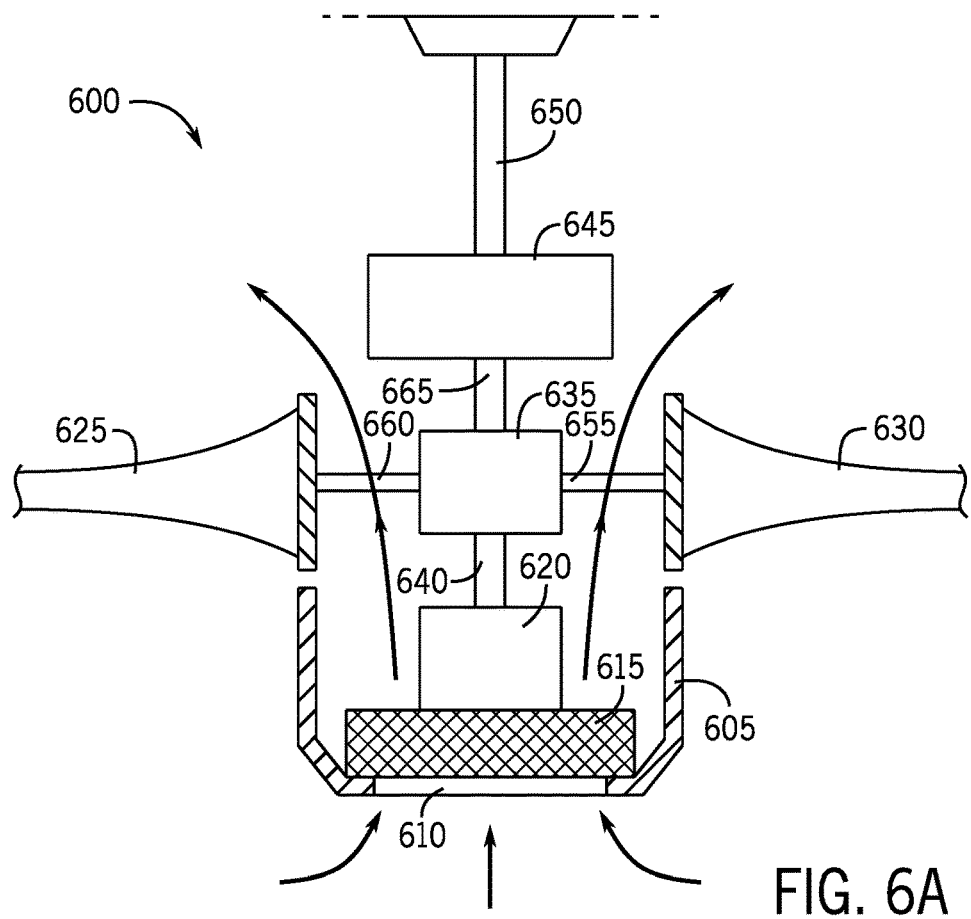
FIG. 6A is a partial cross-sectional view of an example air filtration ceiling fan, illustrating air exhaust flow vectored upwards through a vertical flow channel in a ceiling fan unit of the air filtration ceiling fan.
Figure 6B:
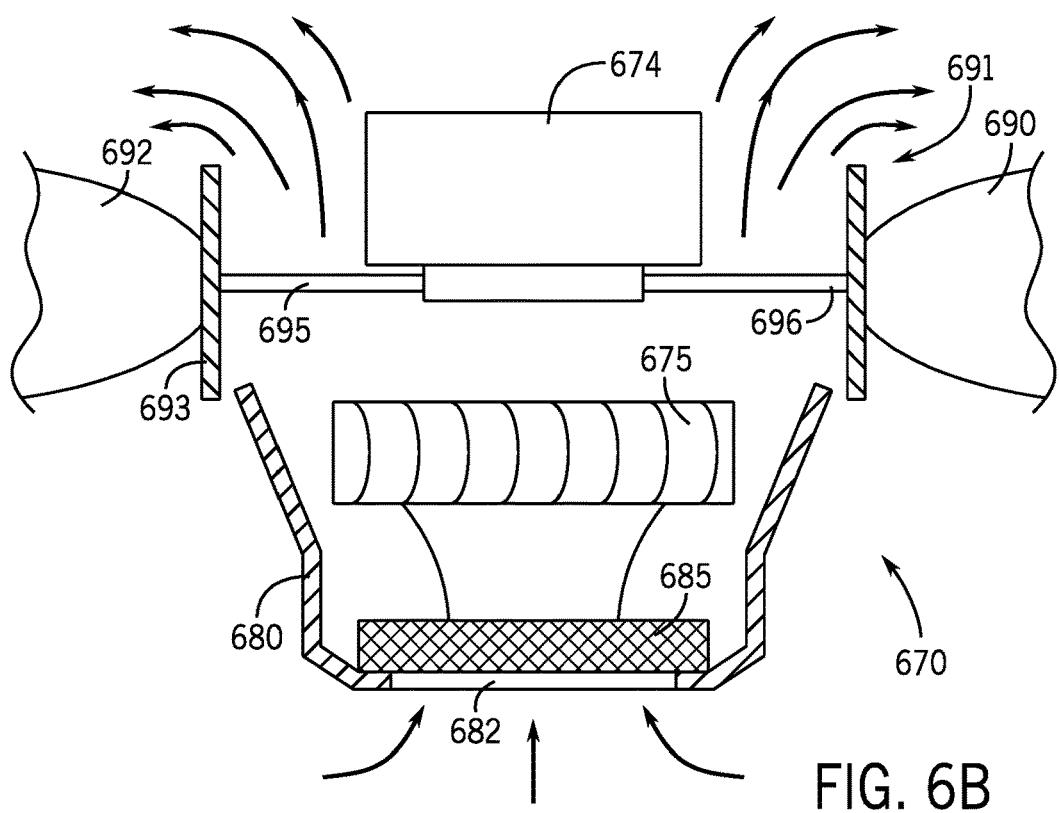
FIG. 6B is a partial cross-sectional view of an alternate example air filtration ceiling fan, illustrating air exhaust flow vectored upwards through a vertical flow channel in a ceiling fan unit of the air filtration ceiling fan.
Figure 6C:
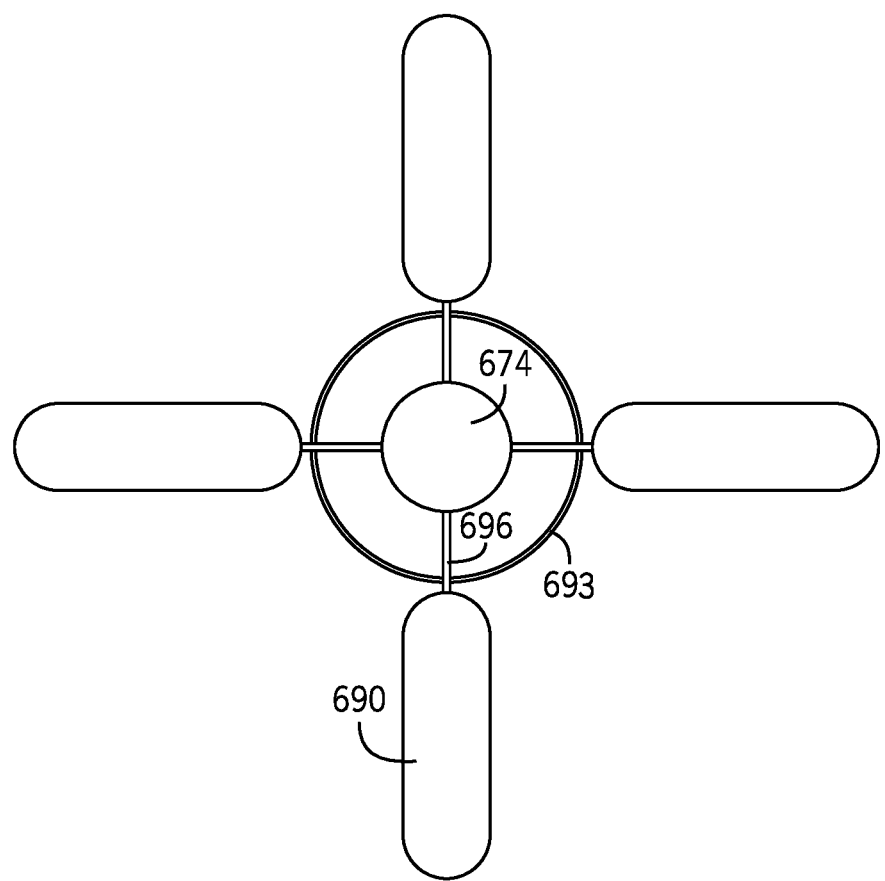
FIG. 6C is a top view of the air filtration ceiling fan of FIG. 6B.

FIGS. 6A and 6B illustrate exhaust flows from an AFU which are vectored upwards through vertical flow channels in the CFU, in accordance with various embodiments of the present invention. In some embodiments, such an exhaust flow may aid efficient air flow in a room and between an AFU and CFU to direct exhaust air up through the CFU above the ceiling fan blades. This exhaust flow may also keep the AFU below the CFU so that the filter elements may be accessed for service, replacement, etc.

In FIG. 6A, an example air filtration ceiling fan 600 includes an air intake 610 through which air may be pulled through a filter element 615 by a filter fan 620. The air may be pulled into an AFU housing 605 and directed up into a CFU housing and out the top of the CFU. As such, the air may be directed around a rod 640 which connects the filter motor 620 and a CFU fan blade connector 635. The CFU fan blade connector 635 may be connected to a fan blade 625 via a spoke 660 and a fan blade 630 via a spoke 655. The fan blades 625, 630 may create, at the connection point with the spokes 660, 655, a CFU housing through which exhaust air from the AFU is pushed out the top of the CFU. The CFU fan blade connector 635 may also be connected to a drive shaft 665 and a fan motor 645. The fan motor 645 may be attached to a ceiling with an attachment mechanism 650 (such as, for example, a downrod, as illustrated in FIG. 6A).

FIG. 6B illustrates another example of an air filtration ceiling fan 670 that exhausts air up through a CFU. Air may be drawn up through an air intake 682 and through a filter element 685 into an AFU housing 680 by an impeller 675 (an example type of filter fan). The air may then pass around fan blade spokes 695, 696 that are connected to a ring deflector 693. The ring deflector, also shown from above in FIG. 6C, creates, in conjunction with other components, a CFU 691 housing that may channel air upward above the ceiling fan blades 690, 692, such that the air is above the blades when it is exhausted. The air may also pass around a fan motor 674. Advantageously, the embodiments of FIGS. 6A-6C may also aid in cooling the fan motor because additional air passes around the fan motor.

Figure 7:
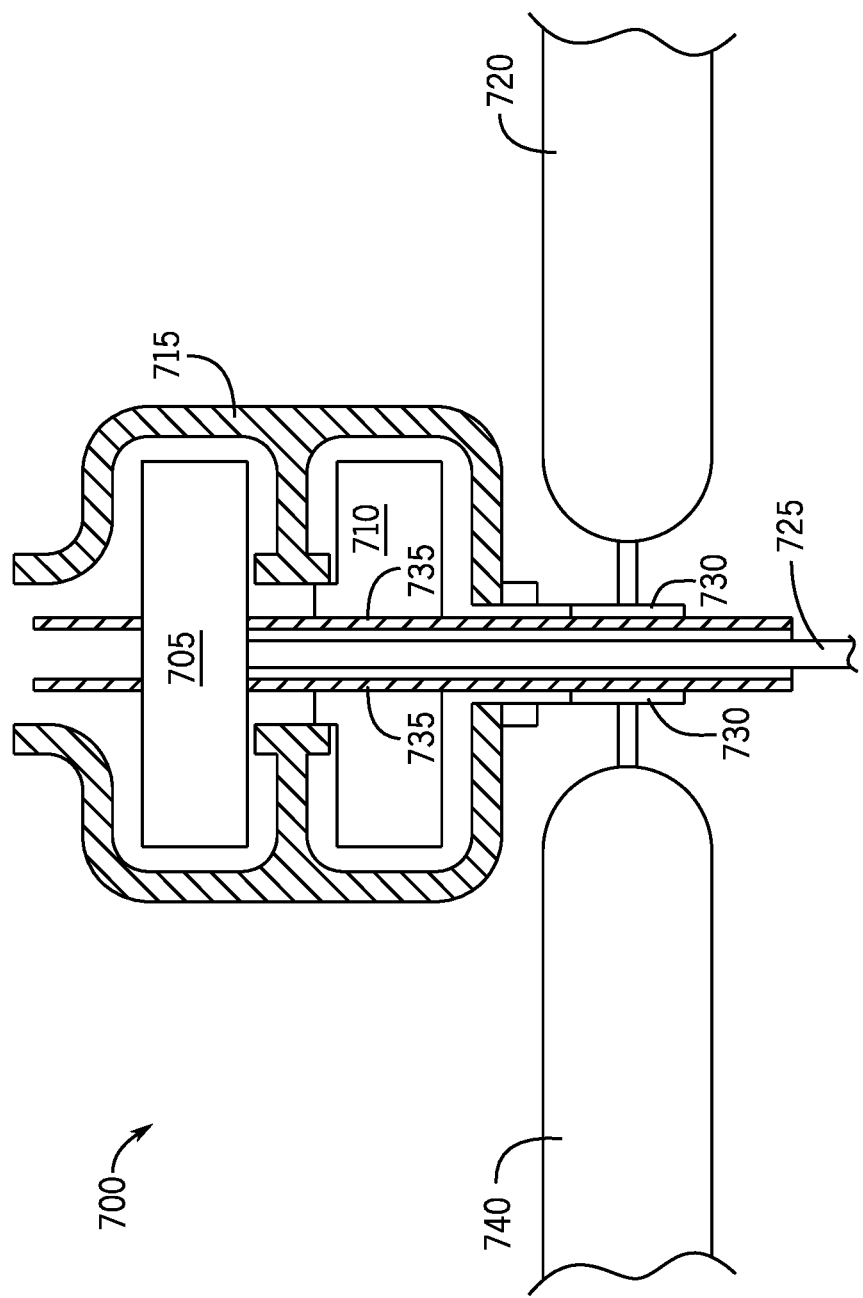
FIG. 7 is a partial cross-sectional view of an example air filtration ceiling fan with an air filtration unit fan positioned within a ceiling fan unit of the air filtration ceiling fan.

FIG. 7 illustrates an alternate configuration, according to various embodiments, in which a filter fan 705 is positioned within a CFU 715. In such an arrangement, the AFU elements may not all be positioned below the CFU 715. The filter fan 705 may turn a filter drive shaft 725 that rotates fan or impeller blades within an AFU (not pictured). The filter drive shaft 725 may be housed by a shaft 735, and both the filter drive shaft 725 and shaft 735 may pass through a fan motor 710. The fan motor 710 may turn a fan drive shaft 730 to rotate fan blades 720 and 740. The filter drive shaft 725 and shaft 735 may pass through the fan drive shaft 730. In such an embodiment, the AFU may be smaller because it does not house the filter fan 705.

In various embodiments, the ceiling fan blades and a filter fan may be powered by the same motor. However, it may be desirable for the ceiling fan and filter fan to turn at different rates. Accordingly, one or more gear boxes may be used to adjust the rotational rate of a drive shaft of a shared motor to output a different rotational rate to one or both of the filter fan or the ceiling fan. In some embodiments, even when two motors are used (one for each of the filter fan and the ceiling fan) a gear box may be included that adjusts a rotational rate of the ceiling fan and/or filter fan. In some embodiments, the rotation rates of the ceiling fan and/or filter fan may be varied (e.g., low, medium, high). Such speeds may be implemented by applying different levels of power to the respective or shared motors, and/or may be adjusted using different gears of a gear box. As described herein, the ceiling fan and the filter fan may be controlled independently or together, including for setting rotation rates of the filter fan and ceiling fan.

Figure 8A:
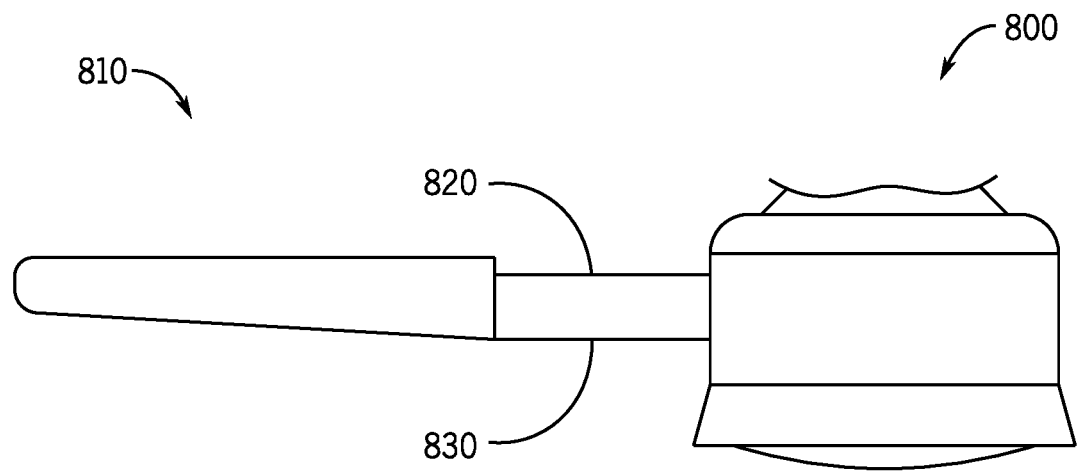
FIG. 8A is a partial side view of an example air filtration ceiling fan with a diverting structure on a fan blade.
Figure 8B:
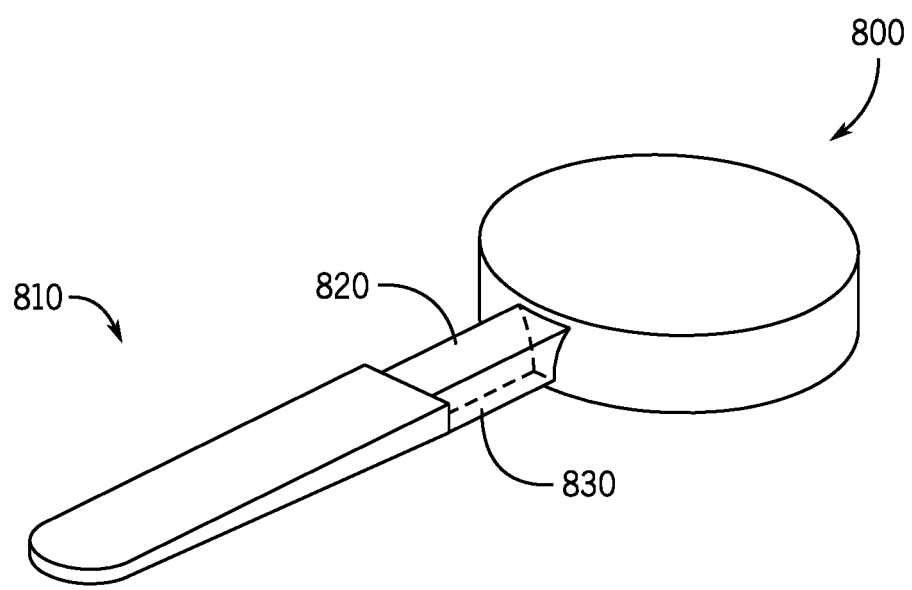
FIG. 8B is a partial perspective view of the air filtration ceiling fan with the diverting structure of FIG. 8A.

FIG. 8A is a partial side view, and FIG. 8B is a partial perspective view, of a fan 800 including a diverting structure 820, according to various embodiments of the present invention. As shown, a fan blade 810 connected to the CFU 800 has a flow diverting structure 820. The flow diverting structure 820 may create additional air flow due to the rotation of the CFU main blades 810, thereby distributing AFU exhaust air into the room more effectively. The diverting structure 820 may be shaped differently than the rest of the fan blade 810, such that exhaust air from an AFU is specifically diverted by the diverting structure 820 to better distribute the air into the room and/or into the air flow created by the rest of the fan blade 810 (or the other fan blades not pictured). In particular, the example diverting structure 820 of FIGS. 8A and 8B have a narrower portion 830 at the bottom of the diverting structure 820. Various configurations of diverting structures may be used in alternate embodiments. In some embodiments, diverting structures may also be used to divert air toward an intake of an AFU (rather than diverting exhaust air away from an AFU). In various embodiments, a respective diverting structure 820 may be provided on one or two or more (e.g., all) fan blades of a fan.

Figure 9:
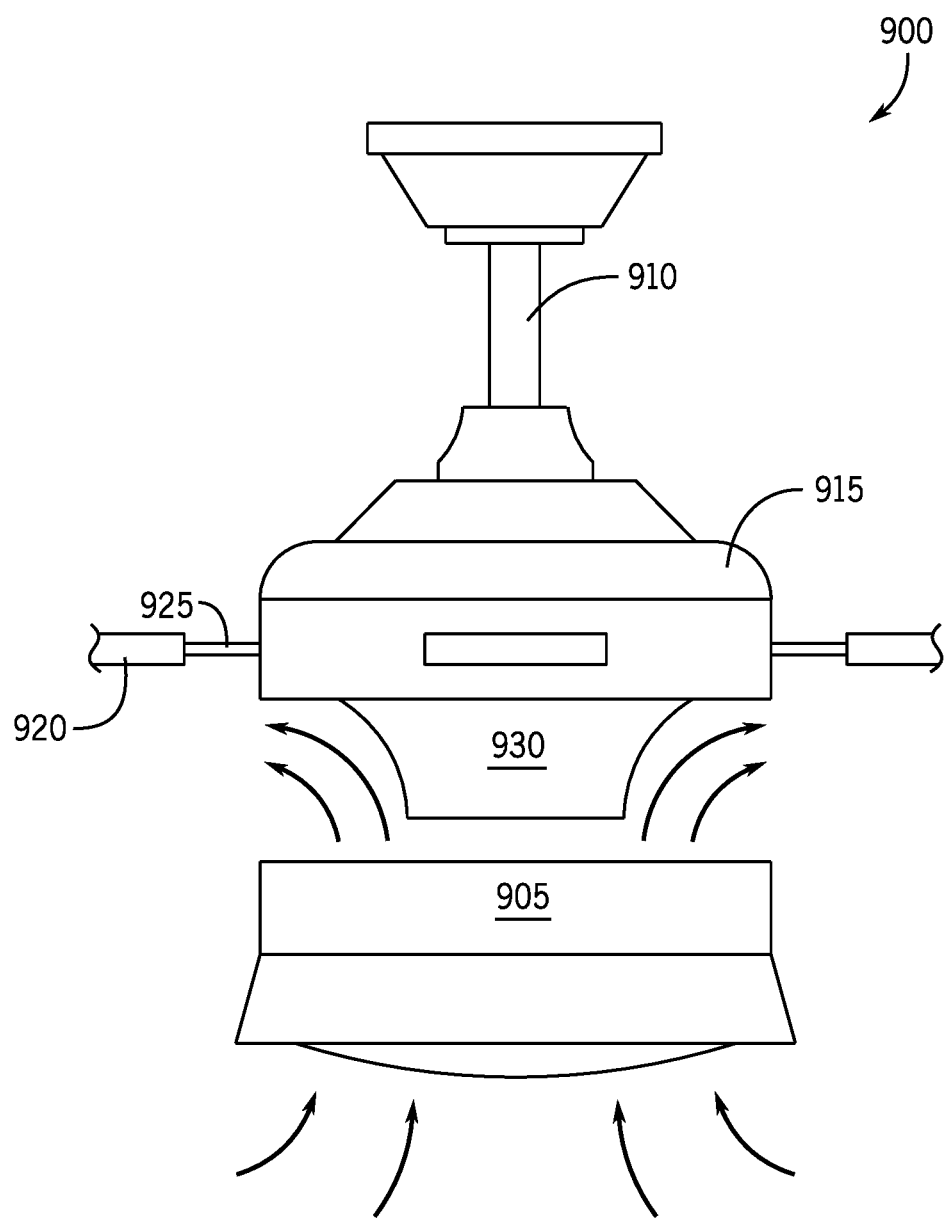
FIG. 9 is partial side view of an example air filtration ceiling fan with a diverting structure on a housing of a ceiling fan unit.

FIG. 9 is a partial side view of a fan 900 including a diverting structure 930, according to various embodiments of the present invention. As shown, a ceiling fan motor housing 915 (attached to the ceiling by a downrod 910) of the CFU includes a flow diverting structure 930. Such a flow diverting structure 930, in conjunction with an AFU 905 exhaust on the top of the AFU 905, would deflect vertically upward flowing AFU exhaust air into the CFU stream (e.g., a stream created by rotation of a fan blade 920 connected to the ceiling fan motor by a spoke 925). Other diverting structures attached to a ceiling fan motor housing may also be used in other embodiments.

Comparing FIGS. 8A-B to FIG. 9, it should be appreciated that the diverting structure in FIG. 9 would be effective regardless of whether the CFU 110 is on (i.e., blades rotating) or off, whereas the diverting structure in FIGS. 8A-B may be effective only when the CFU 110 is on.

Figure 10:
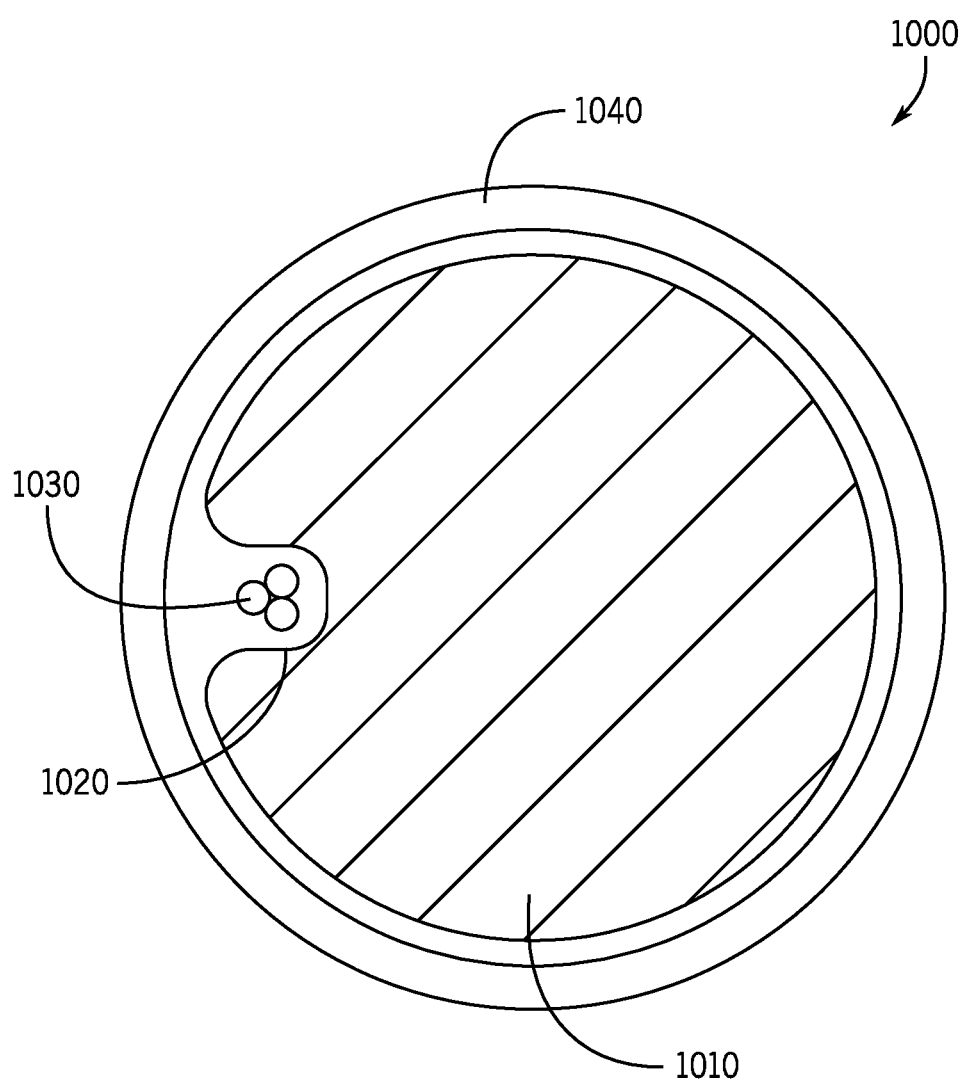
FIG. 10 is a cross-sectional view of an example downrod for an air filtration ceiling fan.

FIG. 10 is a cross-sectional view of a downrod 1000 for a ceiling fan, in accordance with various embodiments of the present invention. Most ceiling fans utilize a stationary and hollow vertical downrod or shaft to affix a ceiling fan to a ceiling. A typical downrod also serves as a hollow conduit for electrical wiring between the junction box and the CFU for the operation of motors and lights. As shown in FIG. 10, a downrod 1000 according to various embodiments includes an extruded center portion 1010. The center portion 1010 includes an exterior groove 1020 in which wiring 1030 may be routed, rather than through a centrally positioned hollow passage through the shaft. An outer tube 1040 may then be provided to conceal the wiring 1030 for aesthetic and safety purposes. Such a configuration may provide for a downrod that is stronger and may hold more weight relative to a hollow downrod, which may be advantageous for the various embodiments described herein, where an air filtration ceiling fan would have more weight and components than a typical ceiling fan.

Figure 11A:
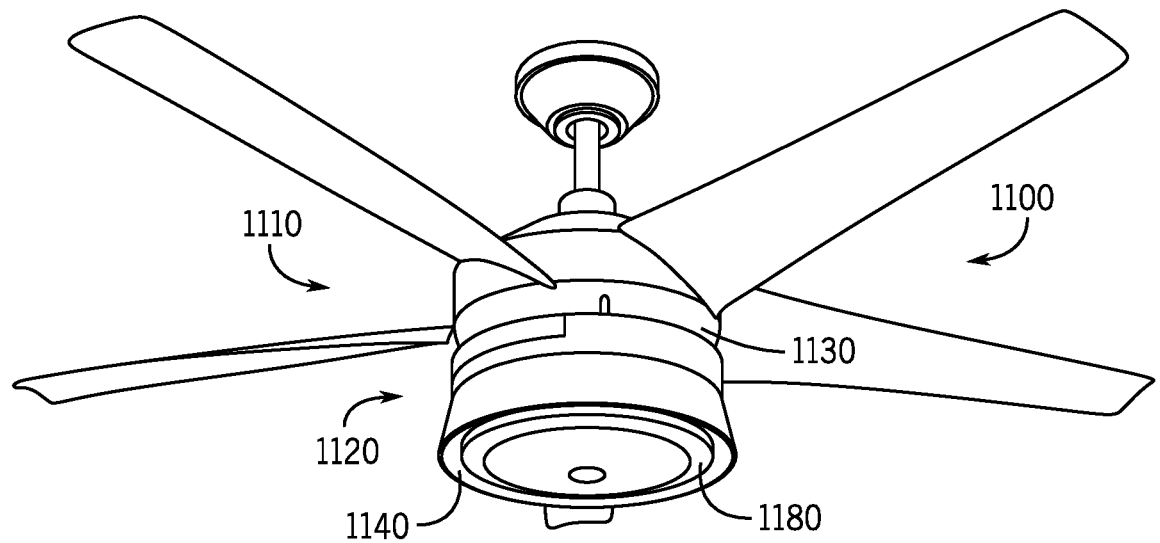
FIG. 11A is a perspective view of an example air filtration ceiling fan with an air intake at the top of an air filtration unit of the air filtration ceiling fan.
Figure 11B:
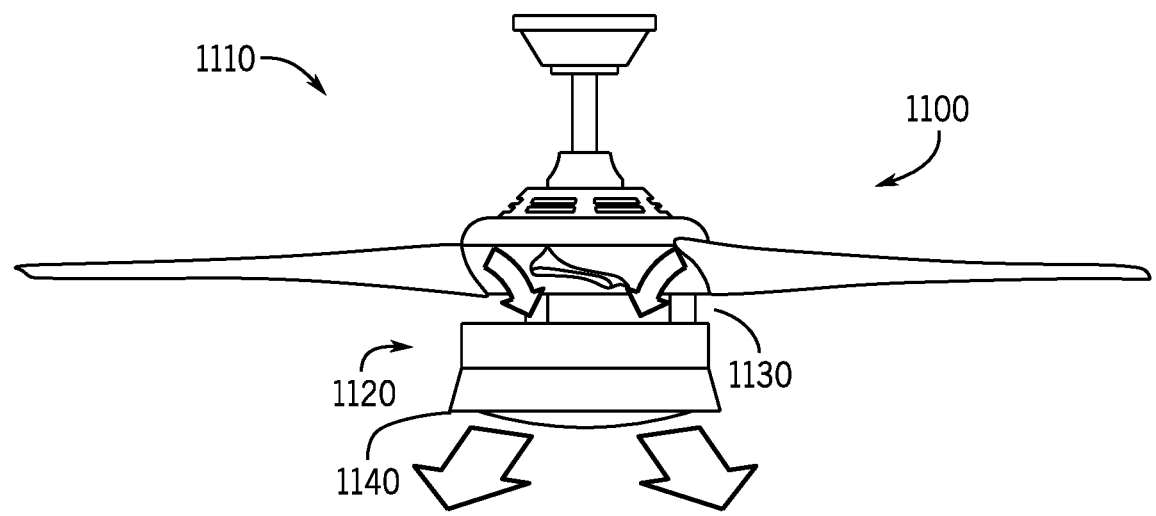
FIG. 11B is a side view of the example air filtration ceiling fan of FIG. 11A.

FIGS. 11A and 11B are perspective and side views, respectively, of a ceiling fan 1100 including an air filtration module, in accordance with various embodiments. FIGS. 12A and 12B show other embodiments with air filtration units (AFUs) that are functionally similar to, but aesthetically different from the embodiment of FIGS. 11A and 11B, and also have differently styled fan blades. With reference to FIG. 11A, the fan includes a CFU 1110 and an AFU 1120 positioned below the CFU 1110. Alternately, the AFU 1120 may be positioned above the CFU 1110.

As shown in FIG. 11B, the AFU 1120 intakes ambient air through an air intake 1130 located on and/or proximate the top surface of the AFU 1120. The AFU 1120 laterally and/or downwardly exhausts air through an exhaust port 1140 located on the bottom surface of the AFU 1120. In other embodiments, the exhaust 1140 might be positioned on either a diagonal wall bridging the side wall and lower surface of the AFU 1120, or solely on the side surface of the AFU 1120. The style of intake described above may receive air through a gap between the CFU 1110 and AFU 1120, and/or through vertically oriented passageways through the CFU 1110. In the example of FIGS. 11A and 11B, a gap does exist between the CFU 1110 and the AFU 1120.

It should be appreciated that a variety of fan types (including impeller and axial fan types) may support the directional flow patterns illustrated in FIG. 11B. As described herein, various embodiments of filter fans may also support reversing the flow patterns shown by reversing the direction in which the filter fan rotates.

Figure 13:
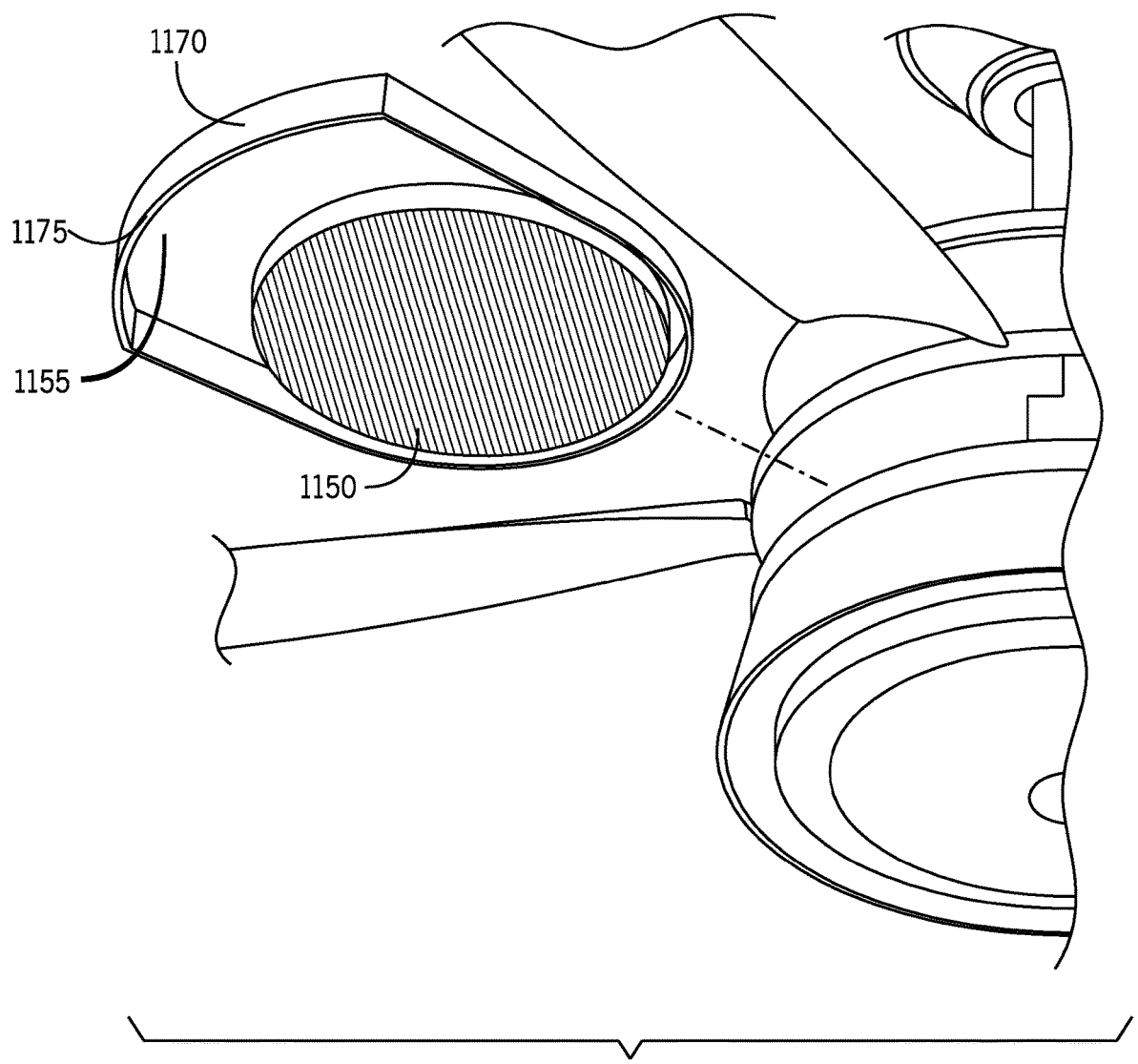
FIG. 13 is a partially-exploded perspective view of a portion of an air filtration ceiling fan with a removed filter element.

FIG. 13 is a partial view of a fan 1100 with a filter assembly 1170 illustrated exploded, in accordance with various embodiments. The AFU 1120 includes one or more filter elements 1150 that are positioned to fully or partially intercept air passing from the intake 1130 to the exhaust 1140 of the AFU 1120. The filter element may be positioned in the air flow path between the AFU intake 1130 and the internal AFU filter fan to minimize contaminant accumulation on the blades of the fan. Alternately, filter elements 1150 can be positioned at any point in the air flow channel between the intake 1130 and the exhaust 1140, including within the intake or exhaust ports, and/or including both before and after the filter fan. Where multiple filter elements 1150 may be used, those elements may be arranged serially with respect to the flow path. In the case of multiple filter elements 1150, the coarser elements may arranged closer to the air intake 1130 to prevent larger-sized contaminant particles from accumulating on the surfaces of the finer elements.

The AFU 1120 may include one or more features to facilitate the removal of the filter element 1150 therefrom for the purpose of cleaning and/or replacing. A laterally sliding integrated filter media and filter assembly 1170 is shown in FIG. 13. In the example of FIGS. 11A, 12A, 12B, and 13, contaminants are expected to accumulate solely or largely on the top surface of the filter media 1150, thereby remaining on the filter media 1150 upon and after removal of the filter media 1150 from the AFU 1120. The assembly 1170 may be removed together then taken to a remote location for cleaning and replacement. The assembly 1170 also defines a space 1155, such that an edge 1175 serves as a handle for easily removing and/or replacing the filter assembly 1170. Advantageously, the filter assembly is also removable from the AFU 1120 in a lateral movement manner, such that the filter assembly does not have to be turned vertically or upside down during removal (or at any time before cleaning, for that matter), which may displace particles from the filter media 1150 during removal.

Again referencing FIGS. 11A, 12A and 12B, a lamp 1180 may be included for illumination of the space surrounding the AFU 1120 and/or CFU 1110. Dome lamps are shown as examples which accommodate positioning of the air intake 1140 around the outside of the lamp (ring lights may also be used and may enable an air intake positioned around the outside of the lamp and/or within the ring-shaped lamp). In general, a variety of lamp configurations may be used to manage the inclusion and positioning of the exhaust 1140, lamp 1180 and other elements of the fan.

Figure 14A:
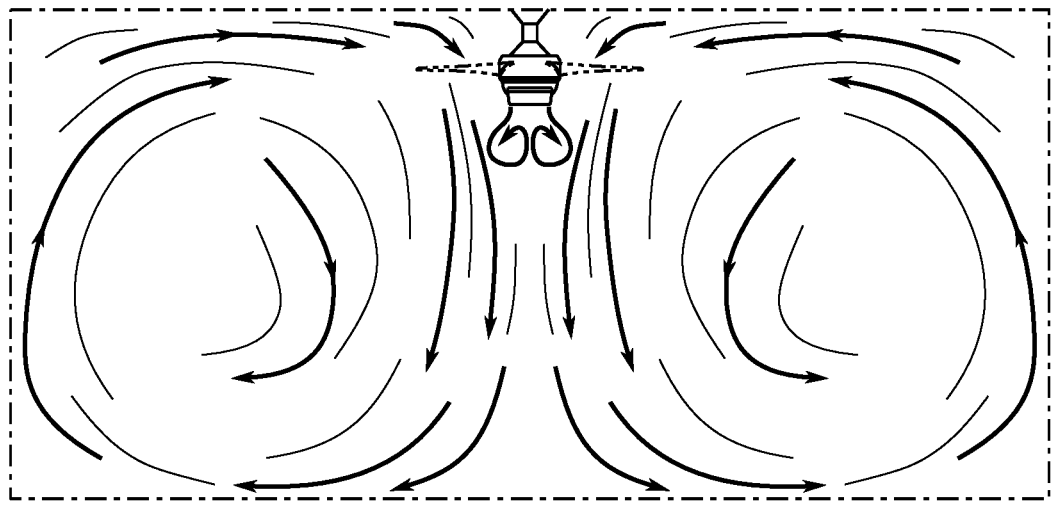
FIG. 14A illustrates a simulated airflow analysis of the air filtration ceiling fan of FIG. 11A based on the blades of the fan rotating in a first direction.
Figure 14B:
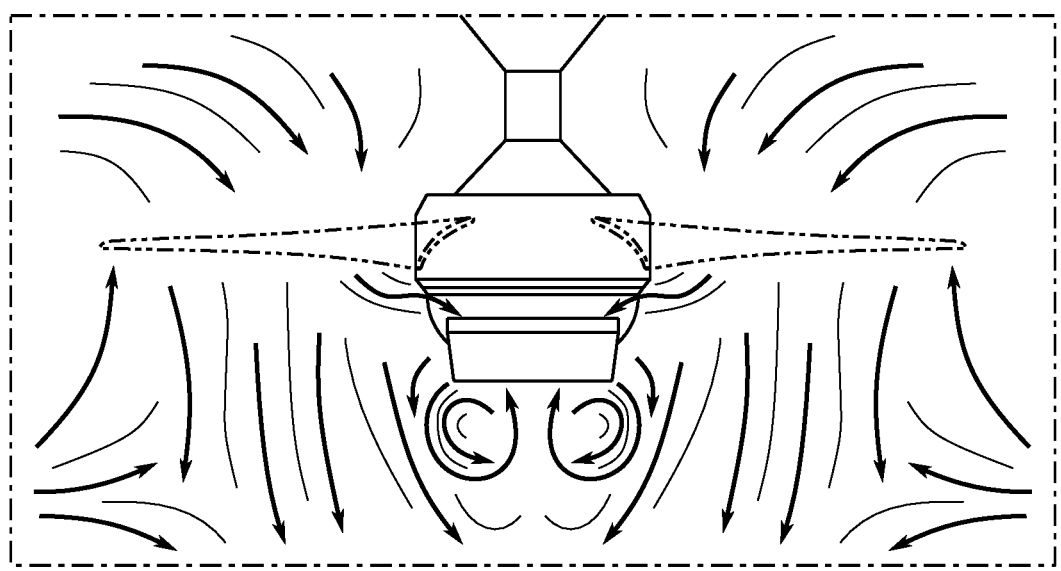
FIG. 14B is an enlarged view of a portion of the analysis of FIG. 14A.

Referencing FIGS. 14A and 14B, the effectiveness of an AFU may be partly dependent upon how its air flow patterns interact with those of the CFU. The computer flow analysis of FIGS. 14A and 14B illustrate a computer flow analysis of the air filtration ceiling fan of FIGS. 11A, 11B, and 13, with the fan blades rotating in first (FIG. 14A) and second (FIG. 14B) directions. The analysis shown suggests that vectoring the exhaust flow of the AFU to the CFU flow stream increases the overall effectiveness of filtration of room air. In particular the detail of FIG. 14B shows that air exhausted out of the AFU is not exhausted back to the air intake, but rather that the air moving into the air intake of the AFU is from the flow of the ceiling fan blades.

Figure 15A:
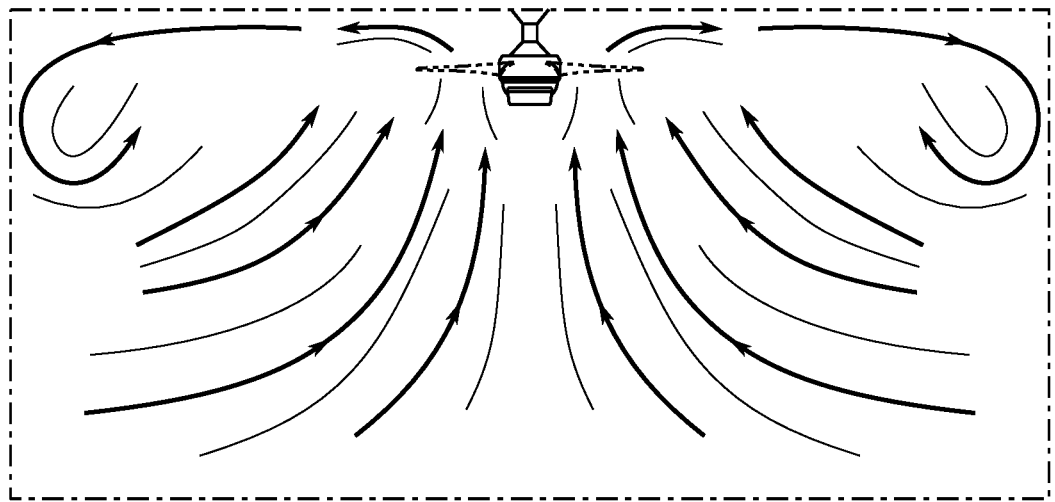
FIG. 15A illustrates a simulated airflow analysis of the air filtration ceiling fan of FIG. 11A based on the blades of the fan rotating in a second direction.
Figure 15B:
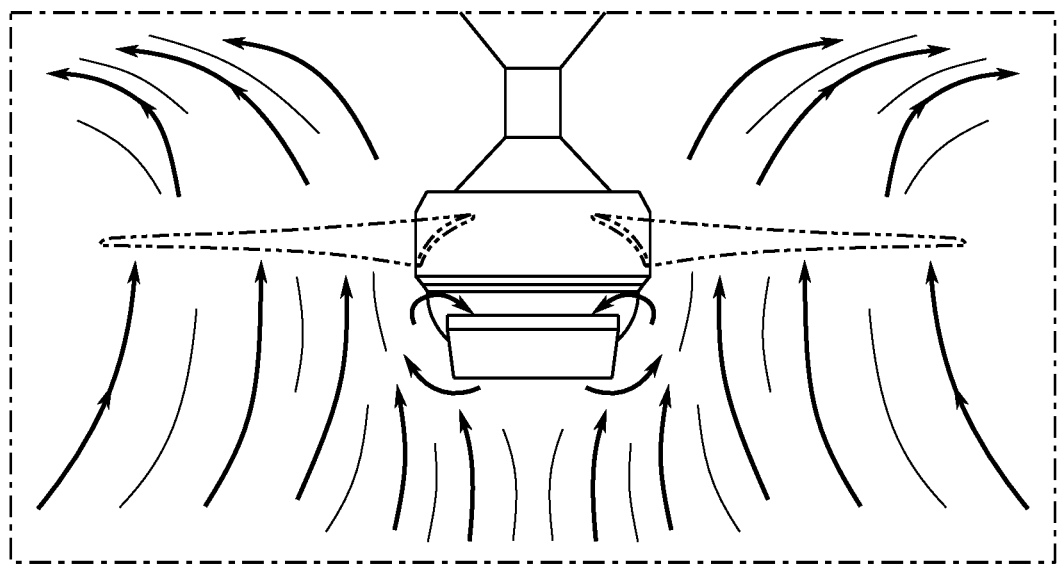
FIG. 15B is an enlarged view of a portion of the analysis of FIG. 15A.

Referencing FIGS. 15A and 15B, an alternate air flow pattern is shown suggesting less effective room air filtration. Note the recirculation of exhaust air to the intake of the AFU in the detail of FIG. 15B. A variety of design implementations may be available to minimize recirculation, including a higher exhaust velocity to impart momentum to the exhaust stream and baffling to vector the exhaust air stream, implementing air diverting structures, reversing flow direction of the AFU, etc.

Figure 16A:
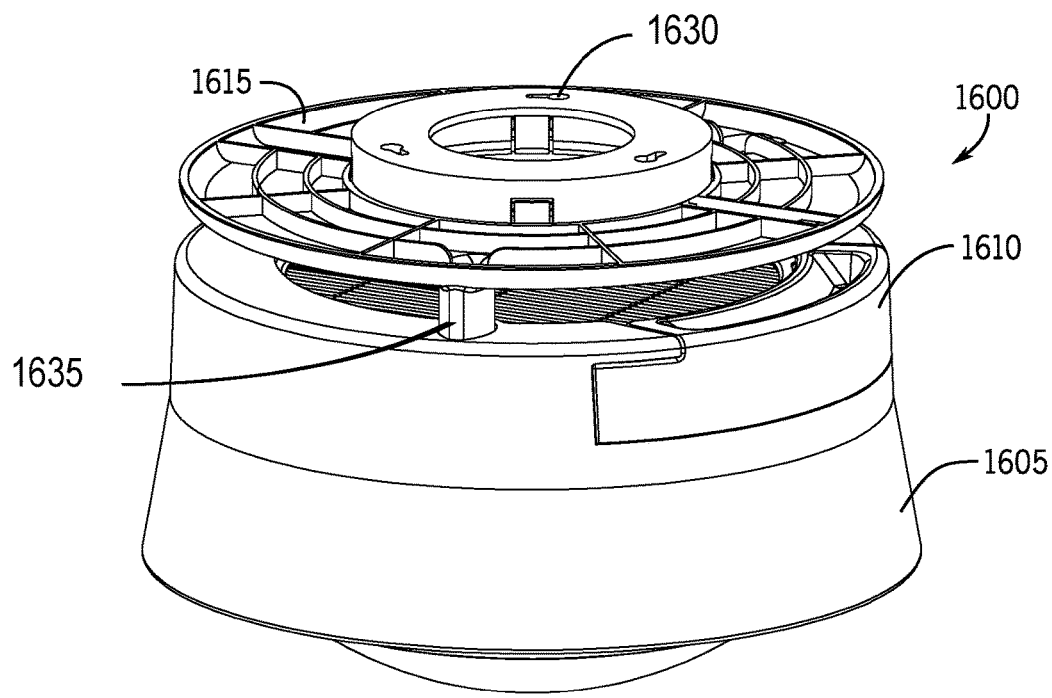
FIG. 16A is a top perspective view of an air filtration unit with an air intake at the top of an air filtration unit.

FIG. 16A illustrates a perspective view of an AFU 1600. The AFU 1600 may include an attachment mechanism 1615 for attaching the AFU 1600 to a CFU housing, a filter assembly 1610, and an AFU housing 1605. The attachment mechanism 1615 may include screw holes 1630 that may slot onto the head of a screw to attach the AFU 1600 to a CFU housing. In various embodiments, other attachment mechanisms may be utilized to attach the AFU 1600 to a CFU housing. A leg 1635 may extend down from the attachment mechanism 1615 to the AFU housing 1605. The AFU 1600 may have other legs which are not visible in FIG. 16A. The legs separate the attachment mechanism 1615 from the AFU housing 1605 to define a space between a bottom surface of the attachment mechanism 1615 and the filter assembly 1610 (and, consequently, a space between the filter assembly 1610 and the CFU to which the AFU 1600 is attached). In this way, air may be pulled through the filter assembly into the AFU housing 1605 through the space between the lower surface of the attachment mechanism 1615 and the filter assembly 1610.

Figure 16B:
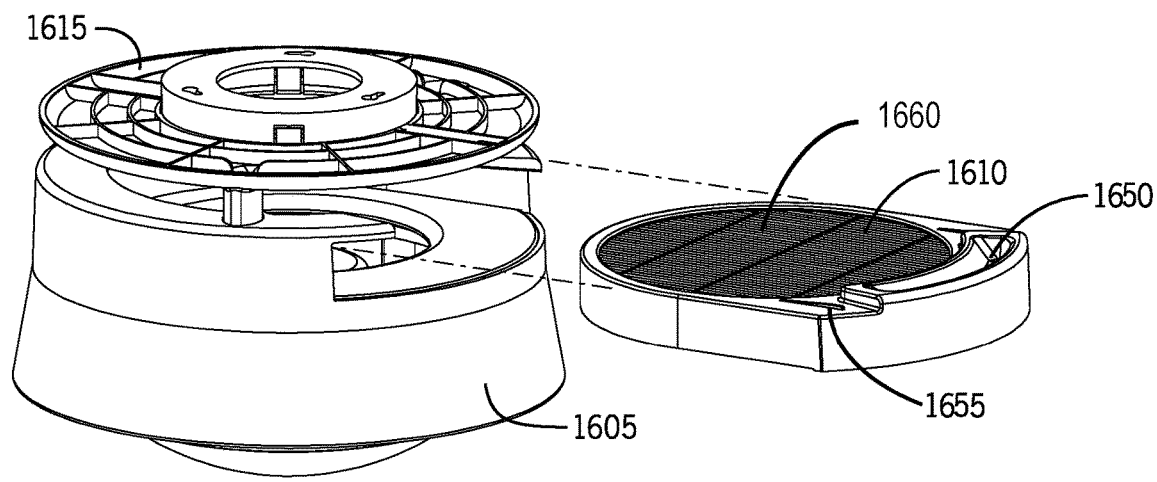
FIG. 16B is a partially-exploded top perspective view of the air filtration unit of FIG. 16A.

FIG. 16B shows the AFU 1600 with the filter assembly 1610 removed from the AFU 1600 housing 1605. The filter assembly 1610 may be generally disk shaped, and may have a corrugated or pleated filter element 1660 that has a surface area of most of the filter assembly 1610 to maximize filtering capacity (and the filter element 1660 may also therefore be disk shaped). The filter assembly 1610 may also include a portion that extends radially outward from the filter element 1660 that may include a handle portion 1650, which provides an easy place for a person to grasp to remove the filter assembly 1610 from the AFU 1600. In addition, the space between the attachment mechanism 1615 and the filter assembly 1610 provides space for a person to grab the handle portion 1650. The filter assembly 1610 may also include a feature 1655 that compression fits with the housing 1605 to secure the filter assembly within the housing 1605. This is advantageous because the AFU 1600 may vibrate from movement of the filter fan in the AFU 1600 and/or from the ceiling fan movement itself. In various embodiments, other features to secure the filter assembly 1610 in the housing 1605 may be utilized.

Figure 17:
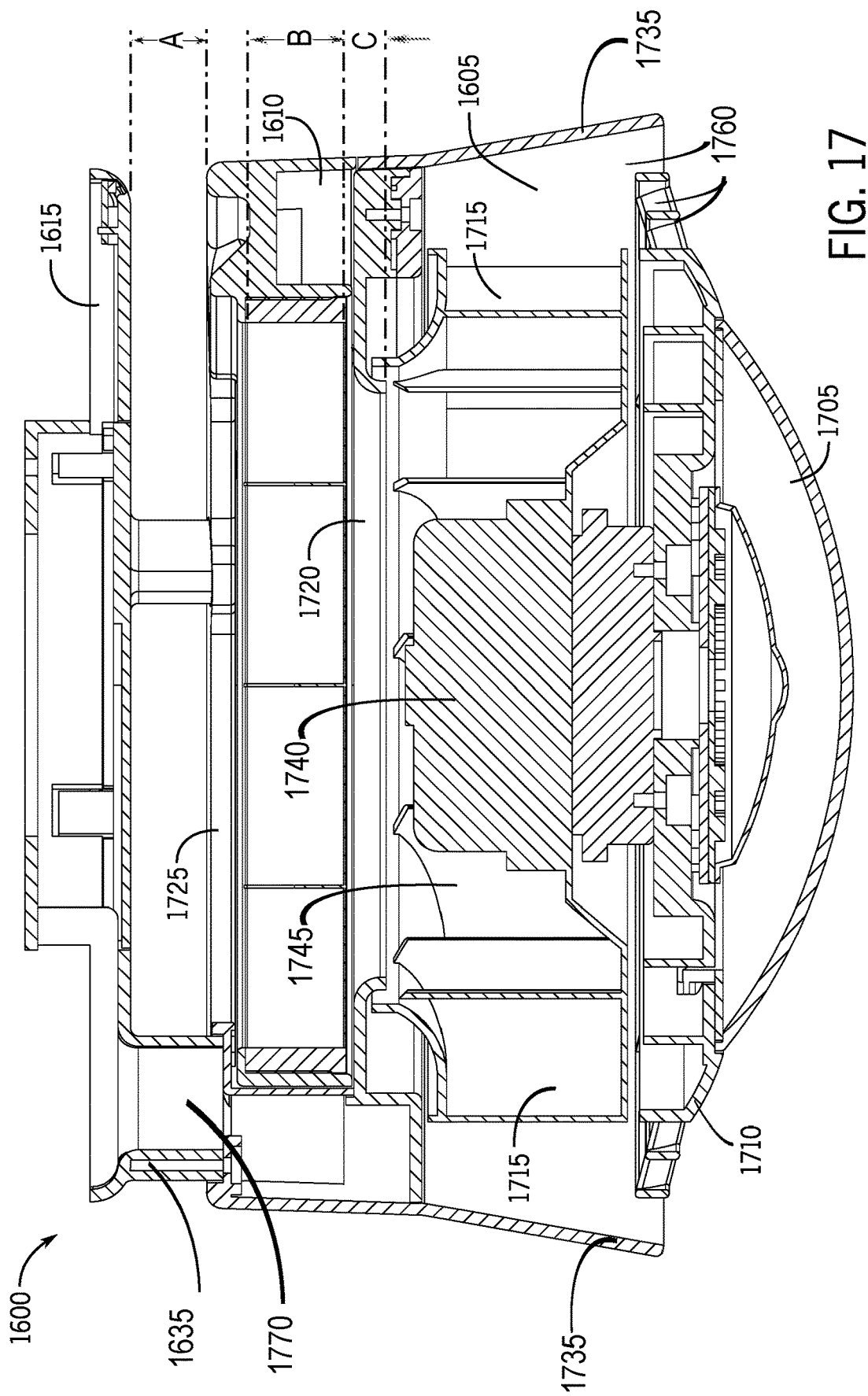
FIG. 17 is a cross-sectional view of the air filtration unit of FIG. 16A.

FIG. 17 shows a cross-section of the AFU 1600. An intake 1725 shows where air may enter through the filter assembly 1610 in between the filter assembly 1610 and the attachment mechanism 1615. An impeller intake 1720 receives air that has passed through the filter element 1660. The air is pulled/pushed by impeller blades 1745 of an impeller 1740 through impeller exhaust 1715 and into exhaust ports 1760 formed by the housing 1605 and/or the exhaust grate 1710. An impeller-type fan may be used to provide less turbulence than an axial fan of a similar flow rate rating, providing superior power efficiency and lower noise, in some embodiments. The housing 1605 also may include a flare 1735 that extends outward away from an axis of the cylindrically shaped AFU 1600. This flare 1735 may impart a lateral flow vector component on the exhaust flow of air, thereby promoting the combination of at least a portion of AFU exhaust air with a CFU air flow pattern. Also shown in FIG. 17 is an opening 1770 in the leg 1635 through which wiring may pass from the CFU to the impeller 1740 and/or a light 1705.

Dimension A of FIG. 17 represents an air intake clearance height between the bottom of the attachment mechanism 1615 and the top of the intake 1725 where air is drawn into the filter assembly 1610. Dimension B of FIG. 17 represents a height or thickness of the filter element 1660 of the filter assembly 1610. Dimension C of FIG. 17 represents a fan inlet clearance height that corresponds with the bottom of the filter element 1660 of the filter assembly 1610 and the top of the impeller 1740 (and corresponds with the impeller intake 1720). The air intake clearance height (dimension A), the height/thickness of the filter element 1660 (dimension B), and/or the fan inlet clearance height (dimension C) may impact airflow filtration efficiency of the AFU 1600. In order to achieve efficient airflow through the AFU 1600, the air intake clearance height (dimension A) may be, for example, anywhere from one-eighth of an inch (⅛th in.) or 3.175 millimeters (mm) to one and a half inches (1½ in.) or 38.1 mm. For example, the air intake clearance height (dimension A) may be any of ⅛th in. (3.175 mm), ¼th in. (6.35 mm), ⅜th in. (9.525 mm), ½ in. (12.7 mm), ⅝th in. (15.875 mm), ¾th in. (19.05 mm), ⅞th in. (22.225 mm), 1 in. (25.4 mm), 1⅛th in. (28.575 mm), 1¼th in. (31.75 mm), 1⅜th in. (34.925 mm), or 1½ in. (38.1 mm). In order to achieve efficient airflow through the AFU 1600, the height/thickness of the filter element 1660 (dimension B) may be, for example, anywhere from one inch (1 in.) or 25.4 mm to four inches (4 in.) or 101.6 mm. For example, the height/thickness of the filter element 1660 (dimension B) may be any of 1 in. (25.4 mm), 1¼th in. (31.75 mm), 1½ in. (38.1 mm), 1¾th in. (44.45 mm), 2 in. (50.8 mm), 2¼th in. (57.15 mm), 2½ in. (63.5 mm), 2¾th in. (69.85 mm), 3 in. (76.2 mm), 3¼th in. (82.55 mm), 3½ in. (88.9 mm), 3¾th in. (95.25 mm), or 4 in. 101.6 mm. In order to achieve efficient airflow through the AFU 1600, the fan inlet clearance height (dimension C) may be, for example, anywhere from one-sixteenth of an inch (1/16th in.) or 1.5875 mm to six inches (6 in.) or 152.4 mm. For example, the fan inlet clearance height (dimension C) may be any of 1/16th in. (1.5875 mm), ⅛th in. (3.175 mm), 3/16th in. (4.7625 mm), ¼th in. (6.35 mm), 5/16th in. (7.9375 mm), ⅜th in. (9.525 mm), 7/16th in. (11.1125 mm), ½ in. (12.7 mm), ⅝th in. (15.875 mm), ¾th in. (19.05 mm), ⅞th in. (22.225 mm), 1 in. (25.4 mm), 1⅛th in. (28.575 mm), 1¼th in. (31.75 mm), 1⅜th in. (34.925 mm), 1½ in. (38.1 mm) 1¾th in. (44.45 mm), 2 in. (50.8 mm), 2¼th in. (57.15 mm), 2½ in. (63.5 mm), 2¾th in. (69.85 mm), 3 in. (76.2 mm), 3¼th in. (82.55 mm), 3½ in. (88.9 mm), 3¾th in. (95.25 mm), 4 in. or (101.6 mm), 4¼th in. (107.95 mm), 4½ in. (114.3 mm), 4¾th in. (120.65 mm), 5 in. (127 mm), 5¼th in. (133.35 mm), 5½ in. (139.7 mm), 5¾th in. (146.05 mm), or 6 in. (152.4 mm).

Figure 18A:
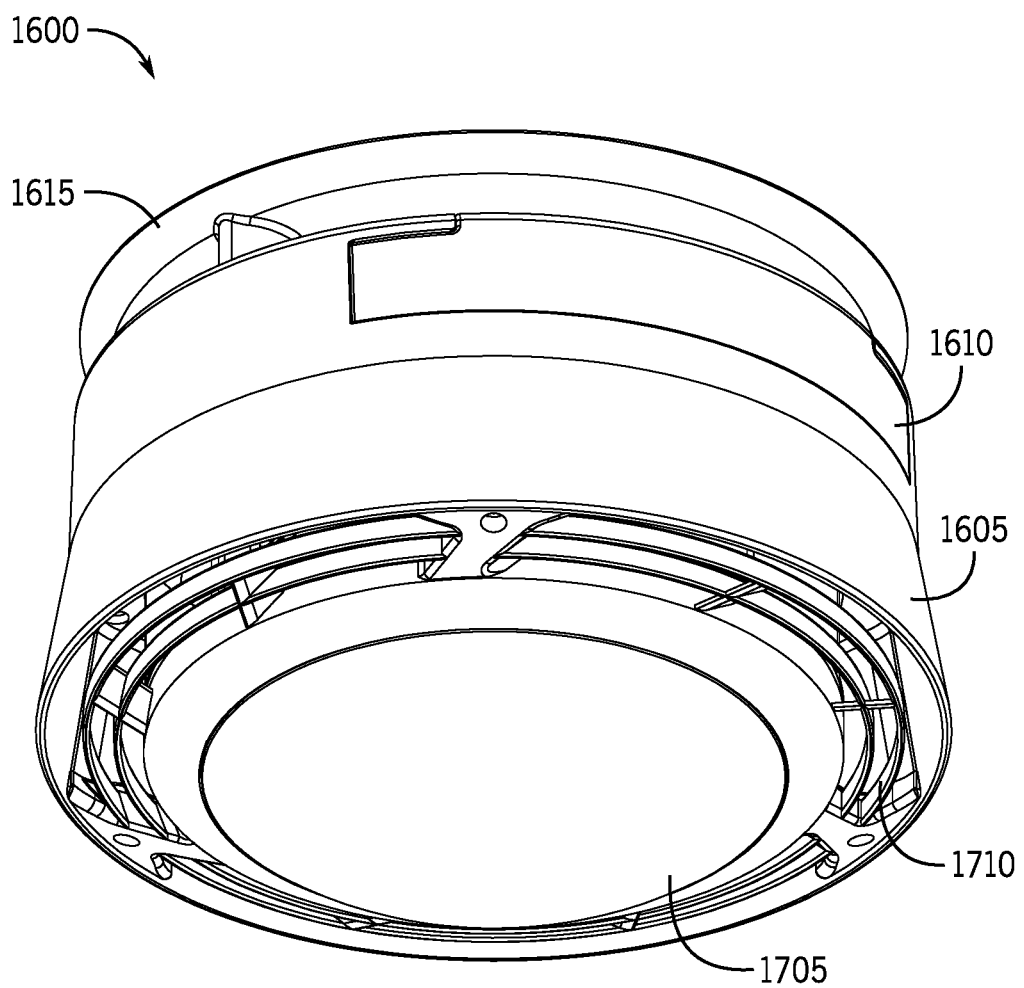
FIG. 18A is a bottom perspective view of the air filtration unit of FIG. 16A.

FIG. 18A provides a bottom view of the AFU 1600. The lamp 1705 is a centrally positioned dome-like structure that provides sufficient space outside of its perimeter for the exhaust ports 1760 of the AFU 1600.

Figure 18B:
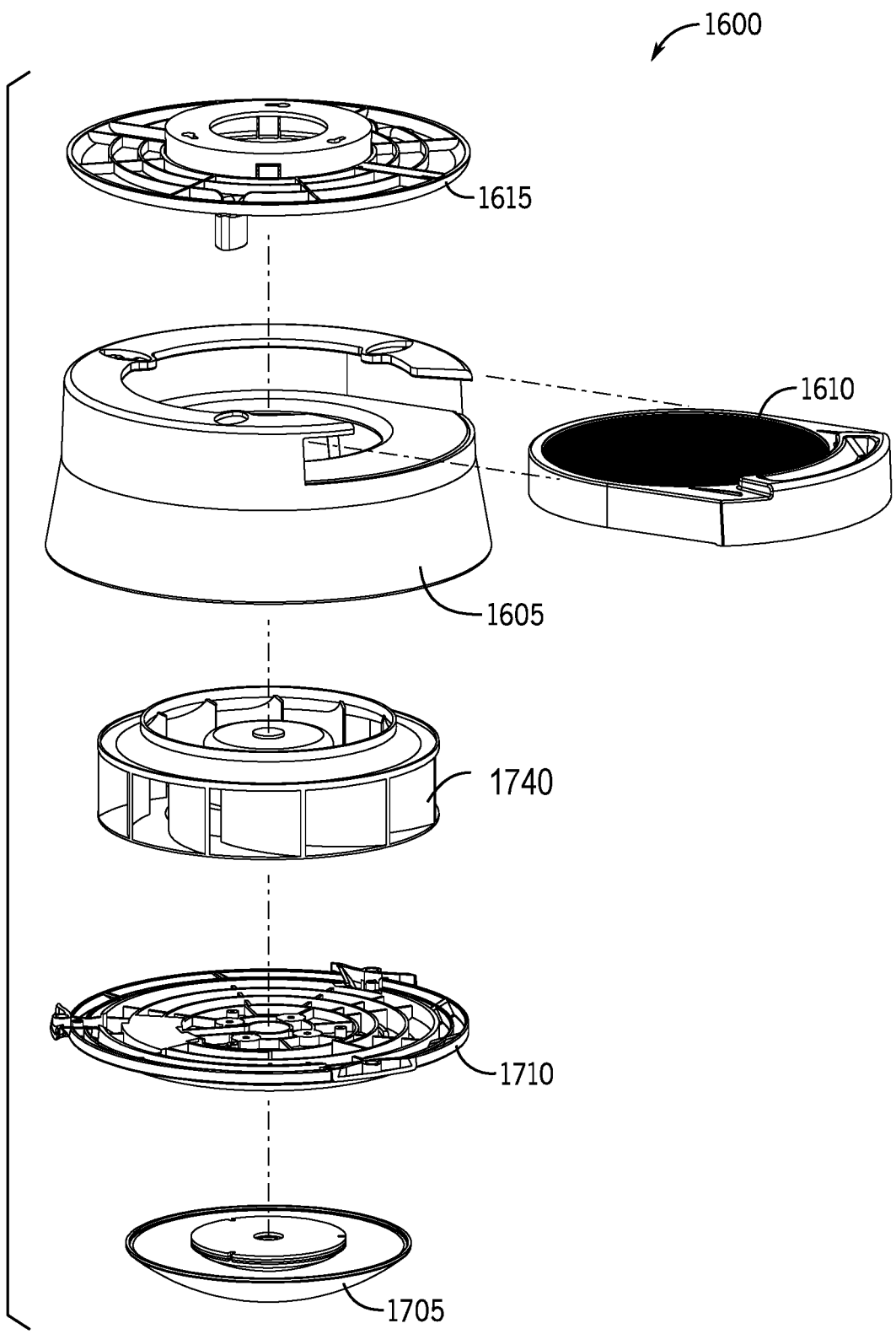
FIG. 18B is an exploded perspective view of the air filtration unit of FIG. 16A

FIG. 18B is an exploded view of the AFU 1600 illustrated in FIGS. 16A, 16B, 17, and 18A. In particular, as illustrated in FIG. 18B, the attachment mechanism 1615 may be disposed on to the top of the housing 1605, the filter assembly 1610 may be disposed in the housing 1605, and the impeller 1740 may be disposed inside the housing 1605. Additionally, the exhaust grate 1710 may be attached to the housing 1605 at the bottom of the housing 1605 (e.g., at a surface that would be below the CFU), and the lamp 1705 attaches to a side of the exhaust grate 1710 opposing the side of the exhaust grate 1710 to which the housing 1605 attaches.

Figure 19:
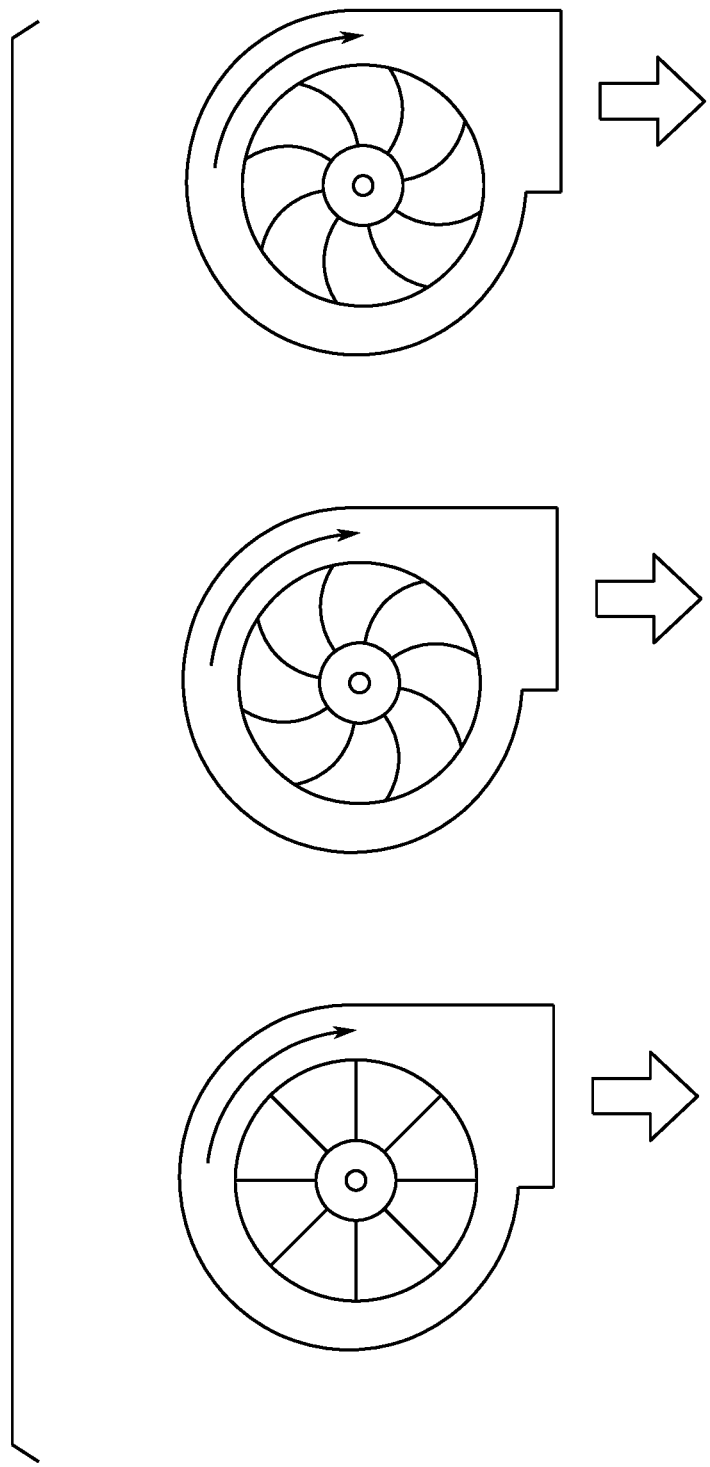
FIG. 19 illustrates examples of three different impeller-style filter fans.

FIG. 19 illustrates 3 types of an impeller style fan. A backward-swept fan blade, shown at the top of FIG. 19, may generally provide quieter operation than would a straight fan blade (bottom of FIG. 19) or forward-swept fan blade (middle of FIG. 19), and may therefore be used where noise reduction is desired.

Various feature types and their variations may be used in CFUs, AFUs, and combined CFU/AFU units. For example, minimum efficiency reporting value (MERV) 6, 8, 11, and/or 13 type filters may be used. In addition, active carbon may be used for odor control in a filter element. Alternating current (AC) or direct current (DC) motors may be used for the ceiling fan and/or filter fan motors. An AC motor may have, for example, three speeds (high, medium, low) and an off setting. A DC motor, for example, may be quieter and may have a greater number of speed settings/range (e.g., a 1-9 range speed settings). The lamp of an air filtration ceiling fan may be a light emitting diode (LED), for example, such as a single brightness (on/off) LED, a dimmable LED, a color change white LED (e.g., 2700K to 7000K), or a color change red/green/blue (RGB) LED. The AFUs described herein may also be used with different fan types and styles, including being optimized for fans with varying blade types. Other features may also be implemented with the air filtration ceiling fans described herein, including implementing an indicator for a dirty fan (e.g., an indicator that the filter should be changed), wireless (e.g., internet, Bluetooth, infrared) connectivity to control ceiling and/or filter fan and/or monitor filter dirtiness, etc.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that apparatuses, systems, and methods consistent with this disclosure may be practiced without these specific details. In other instances, well known methods, procedures, components, and circuits have not been described in detail as not to unnecessarily obscure various aspects of the present disclosure.

We claim:

1. An air filtration ceiling fan apparatus, comprising:
   a ceiling fan unit comprising:
      a motor; and
      a plurality of fan blades operably coupled to the motor;
   an air filtration unit comprising:
      an air intake;
      an exhaust port;
      a filter element; and
      a filter fan configured to move air through the filter element,
      wherein the air intake is disposed adjacent to the ceiling fan unit,
      wherein the exhaust port is disposed further away from the ceiling fan unit than the air intake;
   an attachment mechanism for attaching the air filtration ceiling fan apparatus to a ceiling,
      wherein the attachment mechanism is coupled to a first side of a housing of the motor,
   wherein the air filtration unit is coupled to a second side of the housing of the motor, the second side opposite the first side,
   wherein the ceiling fan unit is operably connected to the air filtration unit to form the air filtration ceiling fan apparatus, and further wherein the air filtration ceiling fan apparatus is configured to attach to a ceiling.

2. The air filtration ceiling fan apparatus of claim 1, wherein the air filtration unit is configured to move the air into the air filtration unit through the air intake and exhaust the air out of the air filtration unit through exhaust port, further wherein the air passes through the filter element between the air intake and the exhaust port.

3. The air filtration ceiling fan apparatus of claim 1, further comprising a space between the ceiling fan unit and the air filtration unit for ambient air or the air moved through the filter element to pass therethrough.

4. The air filtration ceiling fan apparatus of claim 3, wherein the air intake is located at a first side of the air filtration unit proximal to the housing of the motor.

5. The air filtration ceiling fan apparatus of claim 4, wherein the exhaust port is located at a second side of the air filtration unit, wherein the second side opposes the first side.

6. The air filtration ceiling fan apparatus of claim 5, wherein a housing of the air filtration unit is generally cylindrical in shape, and further wherein the housing at the exhaust port flares outward away from an axis of the housing.

7. The air filtration ceiling fan apparatus of claim 2, wherein a housing of the air filtration unit is generally cylindrical in shape.

8. The air filtration ceiling fan apparatus of claim 2, wherein the exhaust port is configured to direct the air moving out of the air filtration unit toward a stream of air created by movement of the plurality of fan blades.

9. The air filtration ceiling fan apparatus of claim 2, wherein the air filtration unit further comprises a light fixture.

10. The air filtration ceiling fan apparatus of claim 9, wherein the light fixture is ring-shaped and one of the air intake or the exhaust port is located within the light fixture.

11. The air filtration ceiling fan apparatus of claim 9, wherein the light fixture is circularly-shaped and one of the air intake or the exhaust port is ring-shaped and located around the light fixture.

12. The air filtration ceiling fan apparatus of claim 1, wherein the filter element comprises a handle portion configured to be grasped by a user to remove the filter element from the air filtration unit.

13. The air filtration ceiling fan apparatus of claim 12, wherein a housing of the air filtration unit is generally cylindrical in shape, and further wherein the handle portion of the filter element comprises a curved surface configured to align with a curved cylindrical surface of the housing of the air filtration unit when the filter element is installed in the air filtration unit.

14. The air filtration ceiling fan apparatus of claim 1, wherein the filter fan and the motor are configured to be controlled together.

15. The air filtration ceiling fan apparatus of claim 1, wherein the filter fan and the motor are configured to independently controlled.

16. An air filtration apparatus, comprising:
a housing;
a filter element within the housing,
   wherein the filter element is configured to slide laterally from the housing;
an air intake;
an exhaust port; and
a filter fan configured to move air in a first direction into the housing through the air intake, through the filter element, and out of the housing through the exhaust port,
wherein the air filtration apparatus is configured to attach to a ceiling fan,
wherein the air intake is configured to be adjacent to the ceiling fan and the exhaust port is configured to be further from the ceiling fan.

17. The air filtration apparatus of claim 16, wherein the housing is generally cylindrical in shape, and further wherein the housing is configured to attach to a housing of a motor of the ceiling fan such that air flow from a plurality of fan blades of ceiling fan is not blocked by the air filtration apparatus when the air filtration apparatus is attached to the ceiling fan.

18. The air filtration apparatus of claim 1, wherein when installed in a room, the ceiling fan unit is disposed adjacent to a ceiling of the room, and the air filtration unit is disposed on an opposite side of the ceiling fan unit from the ceiling of the room, wherein the air intake is disposed closer to the ceiling than the exhaust port.

* * * * *